INVENTORS
JOHN W. ELDRED,
JAMES B. LEGG,
JERRY L. HULL &
JOSEPH C. JOHNSON
BY MAHONEYS, MILLER & RAMBO
BY Wm. V. Miller
ATTORNEYS

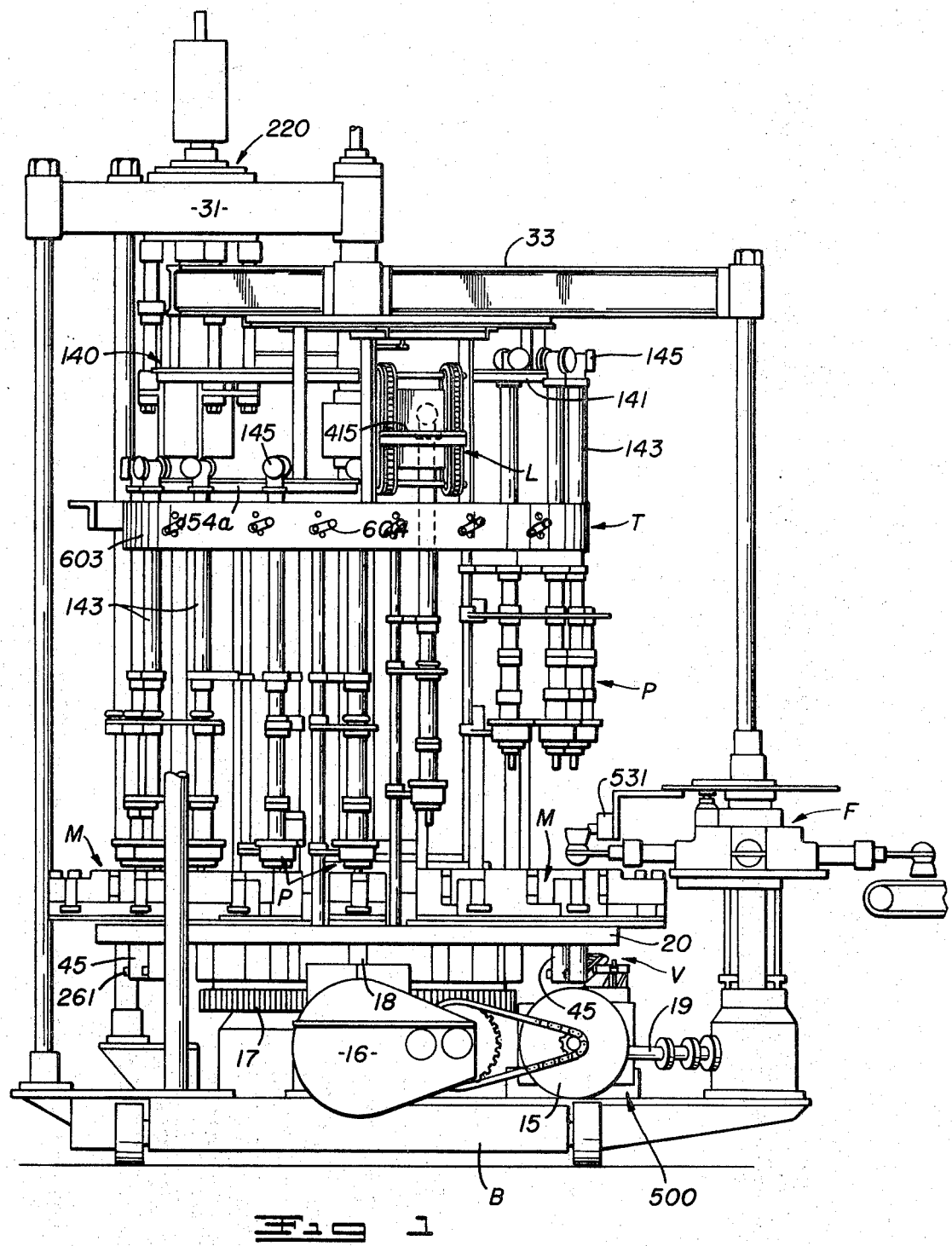

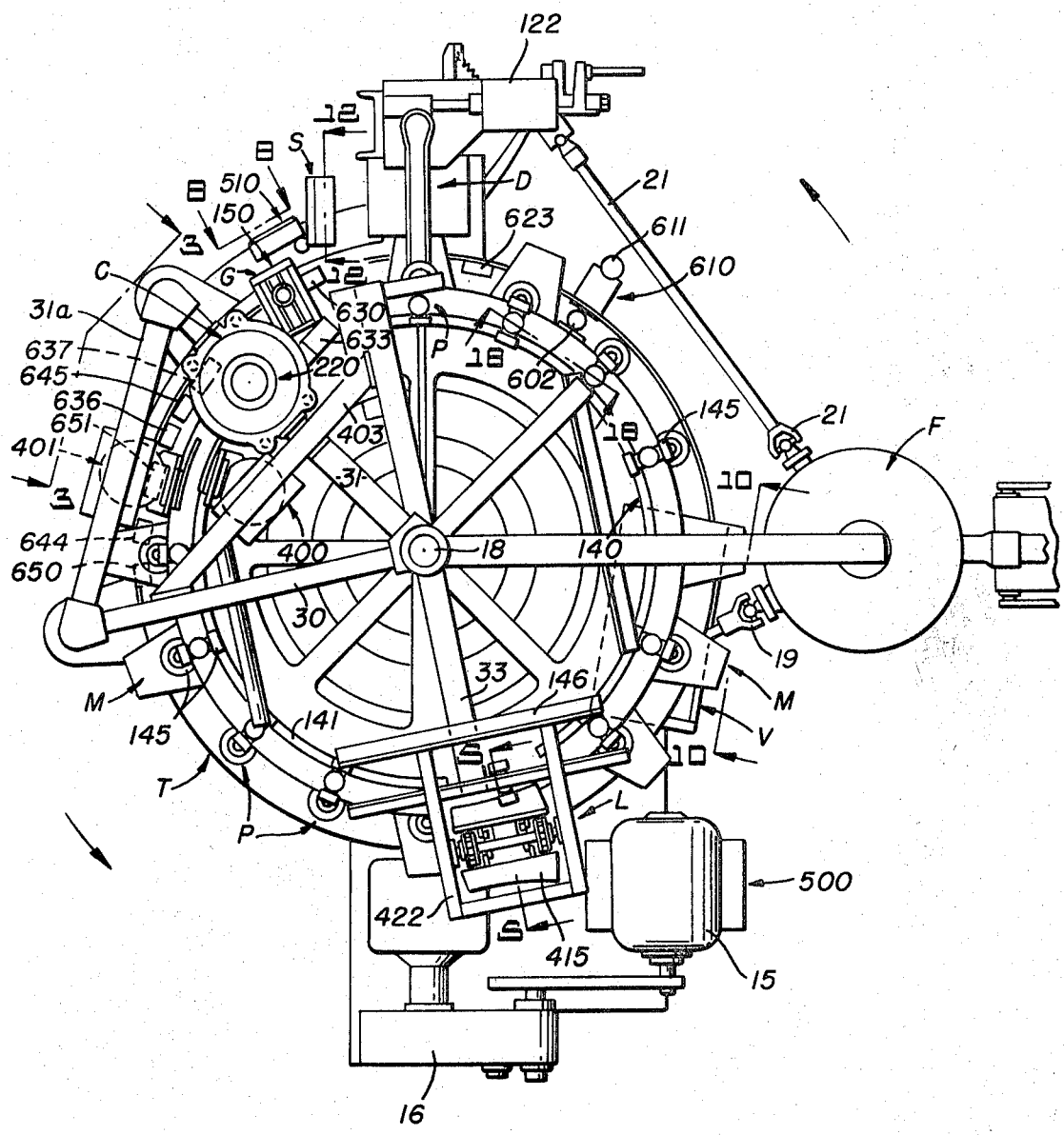

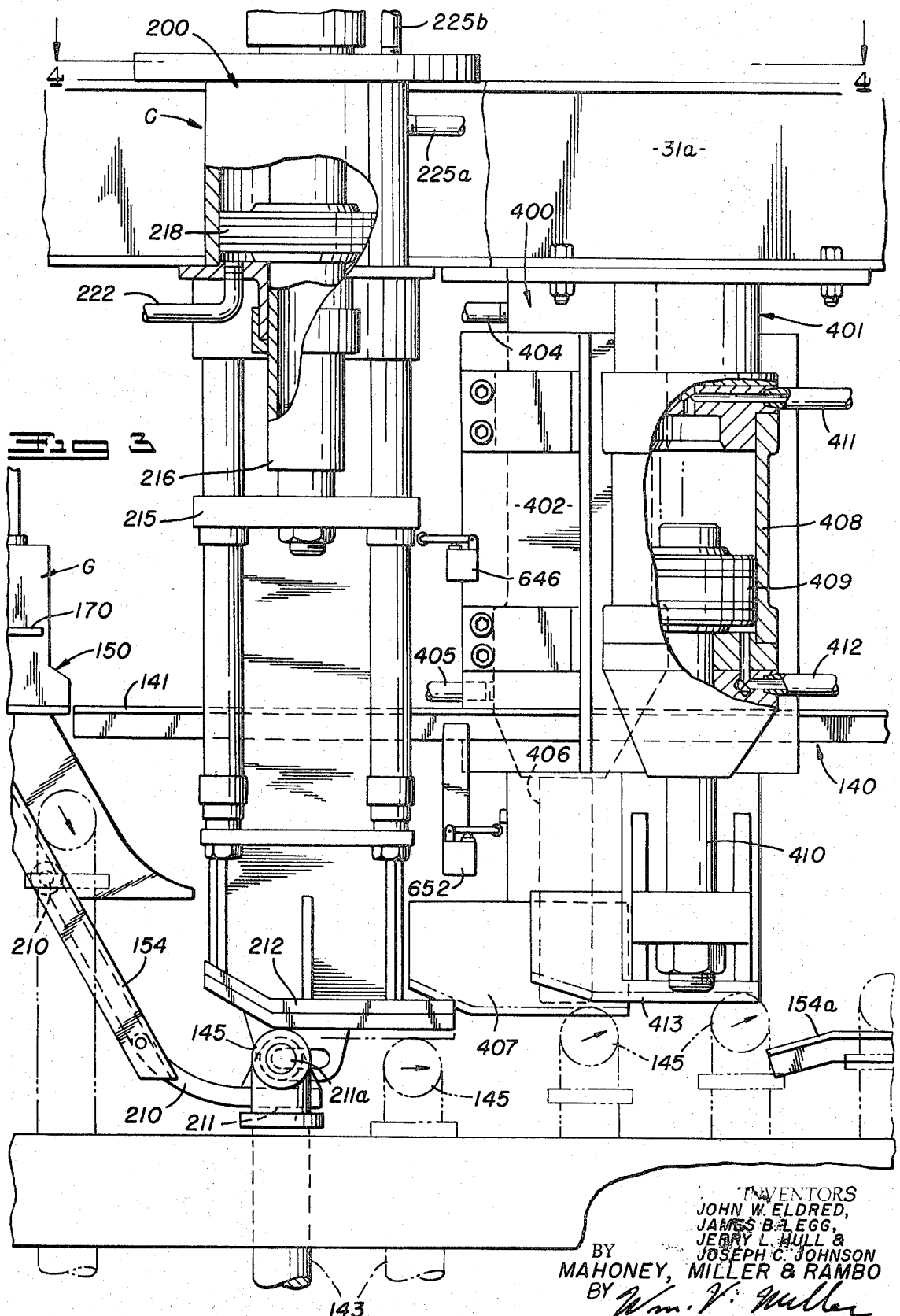

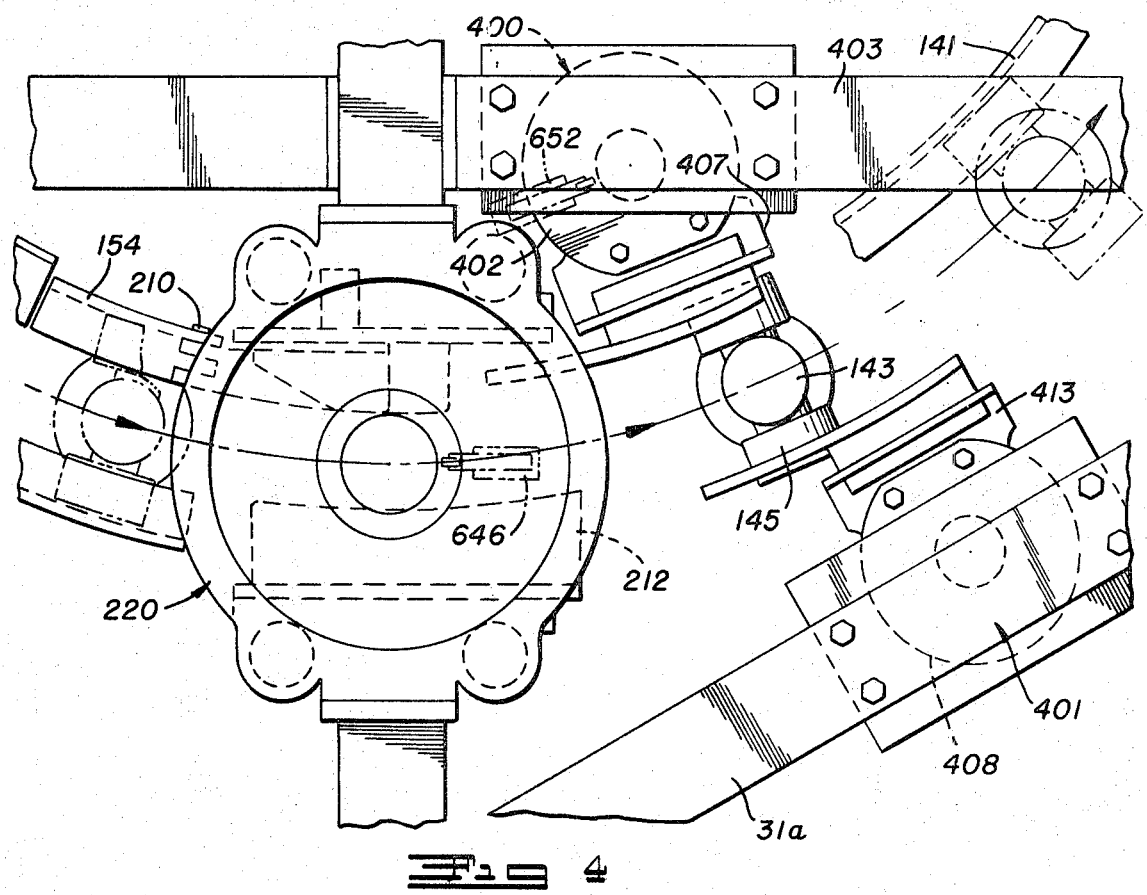
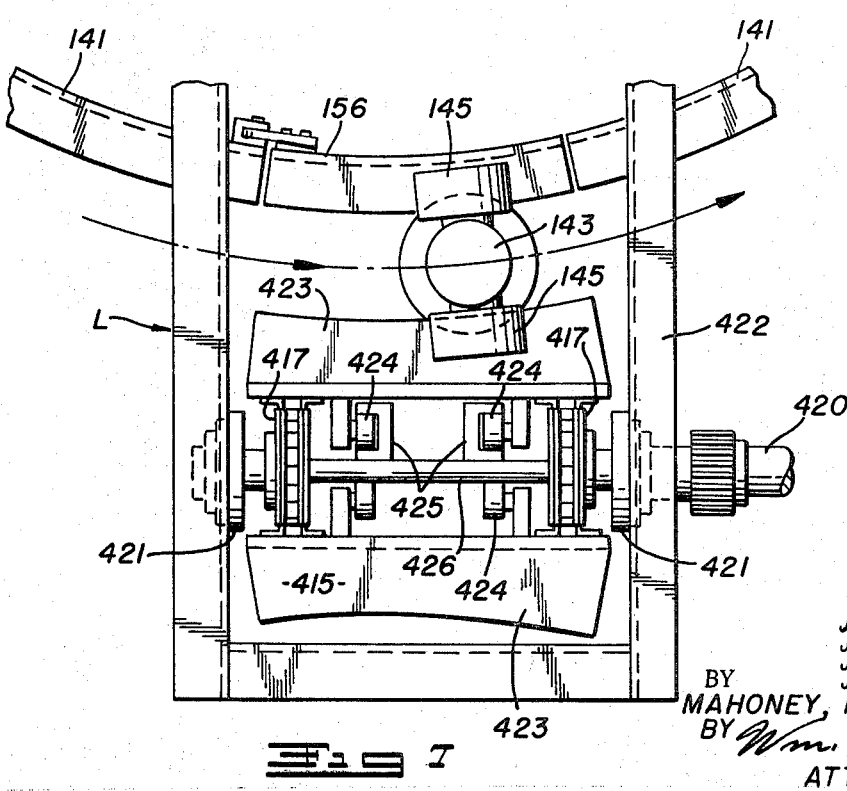

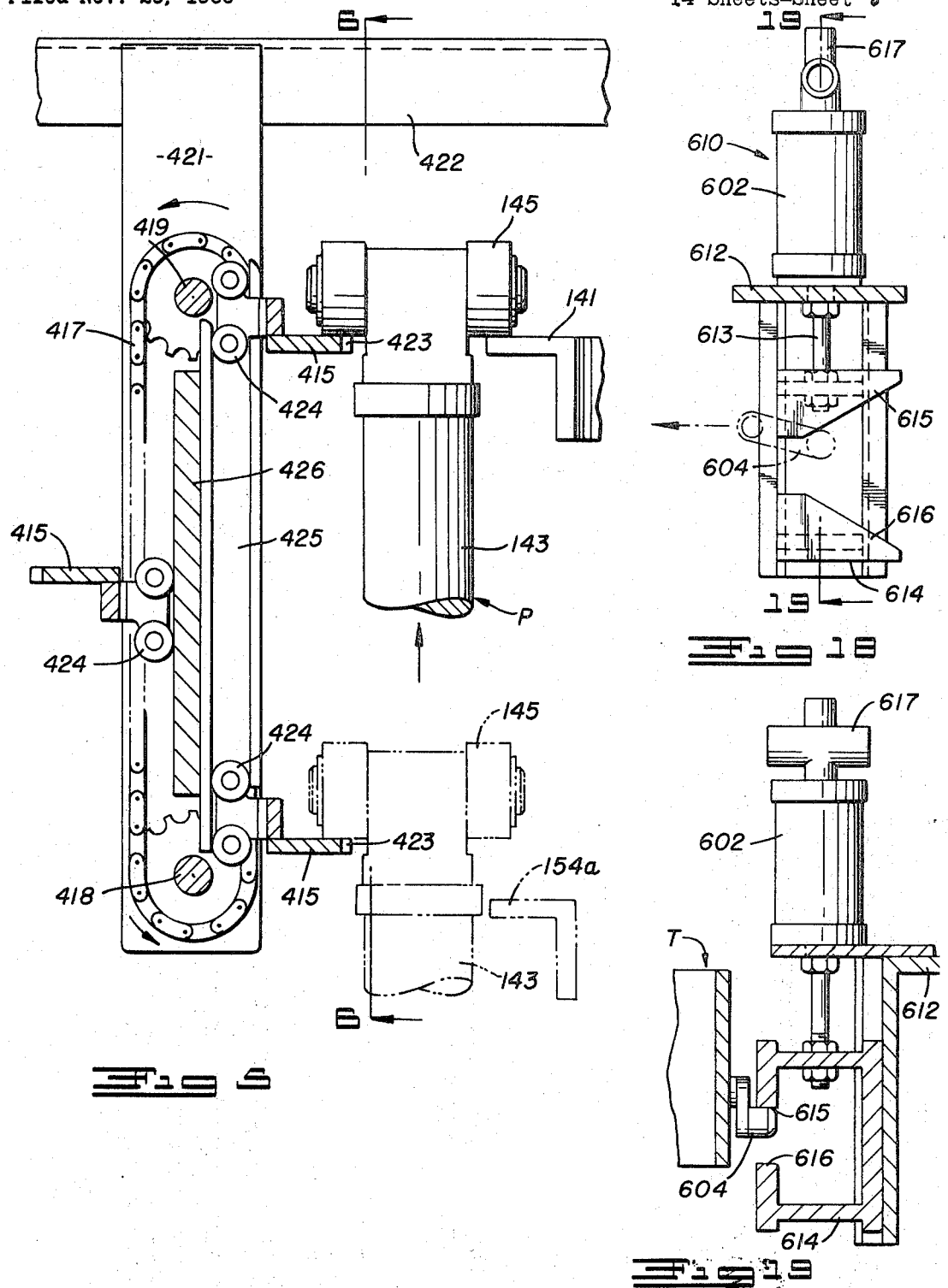

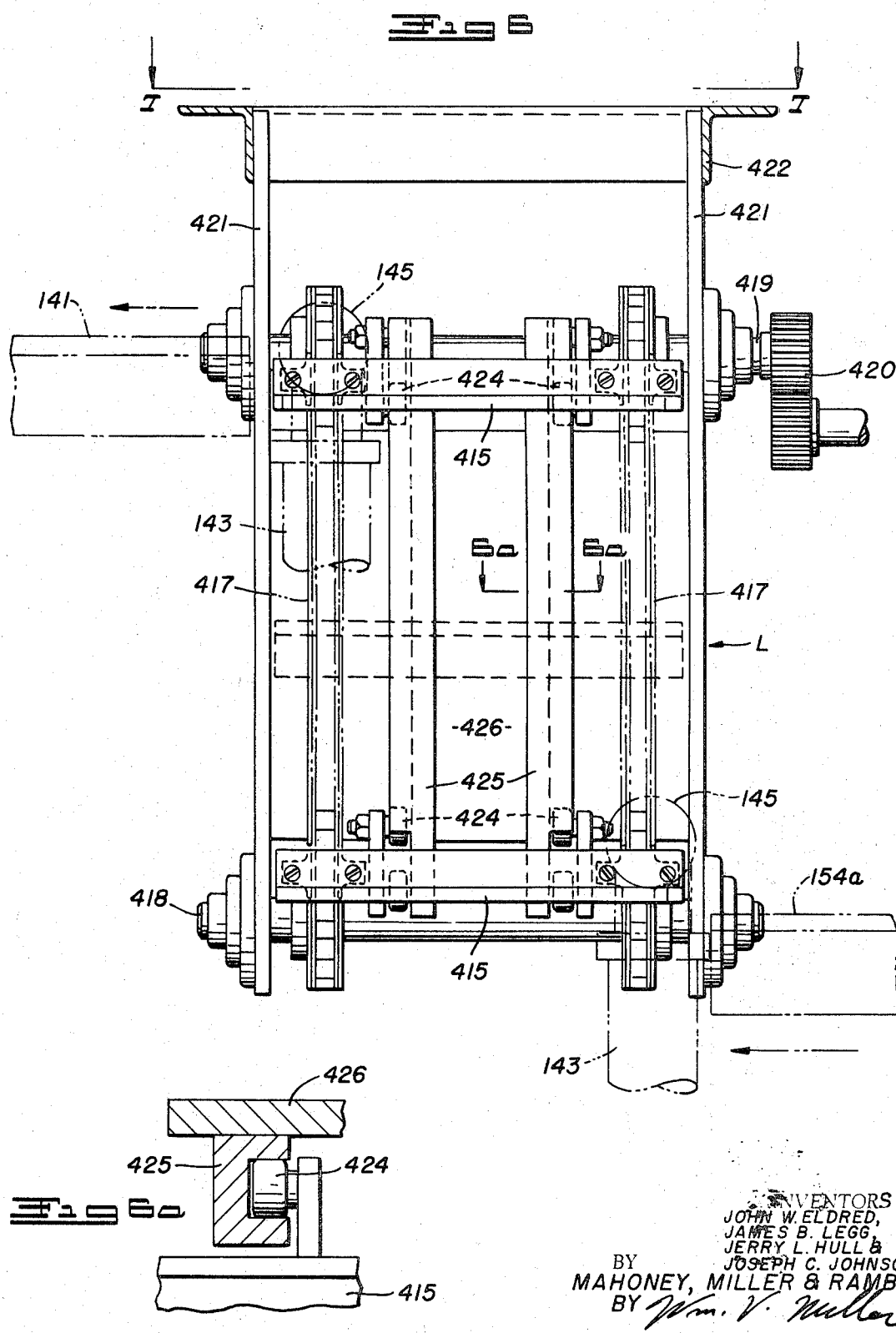

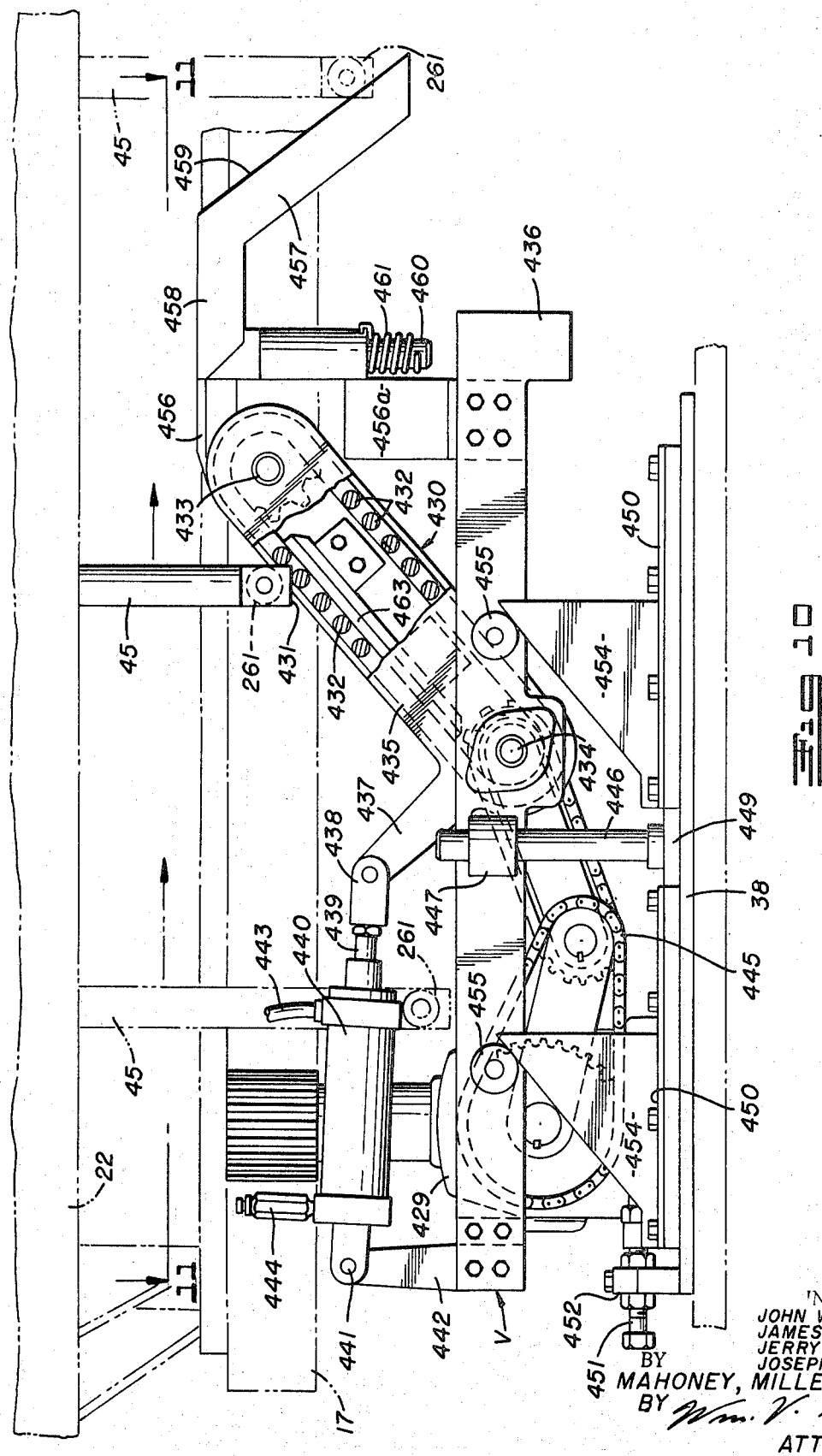

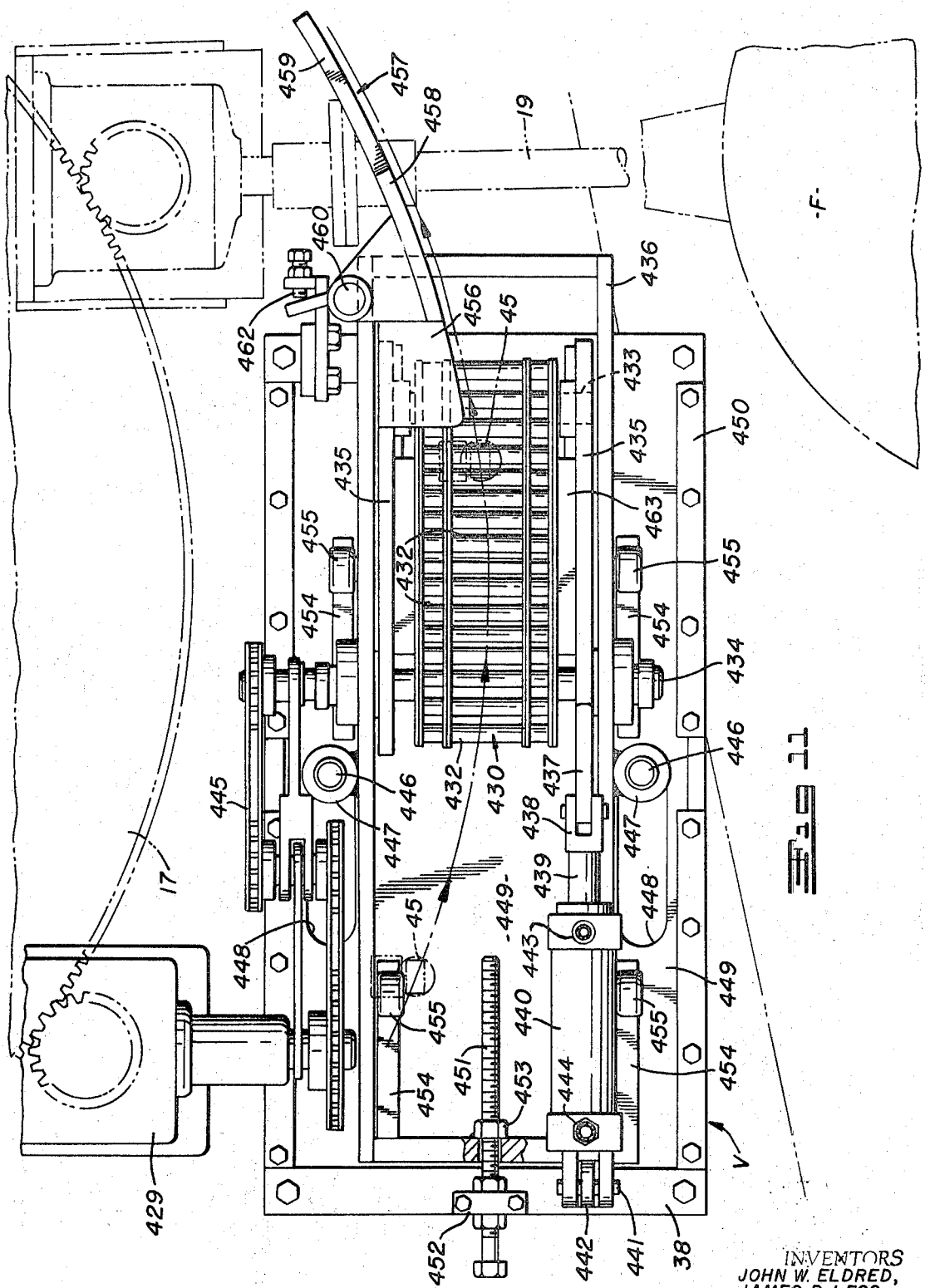

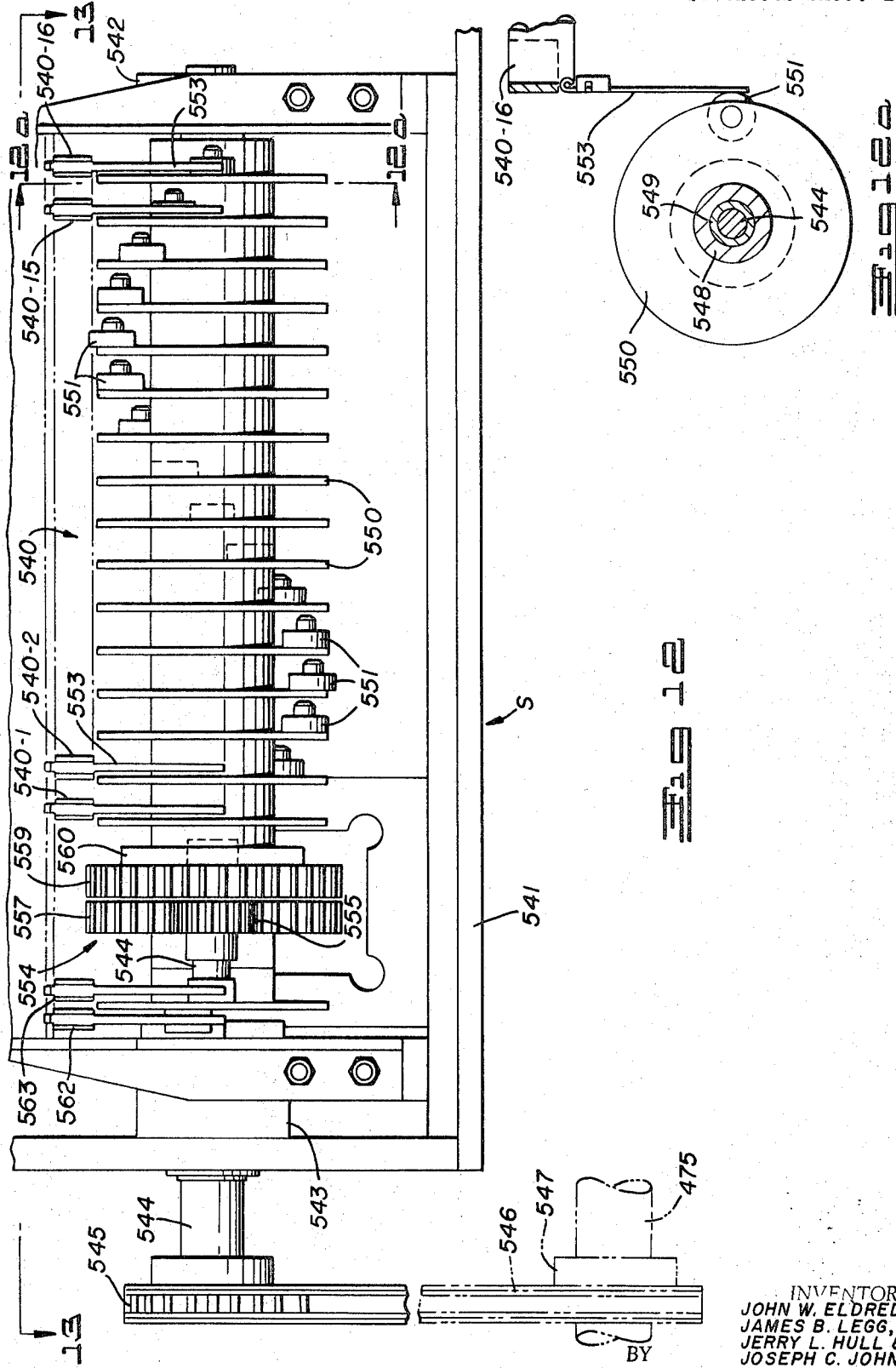

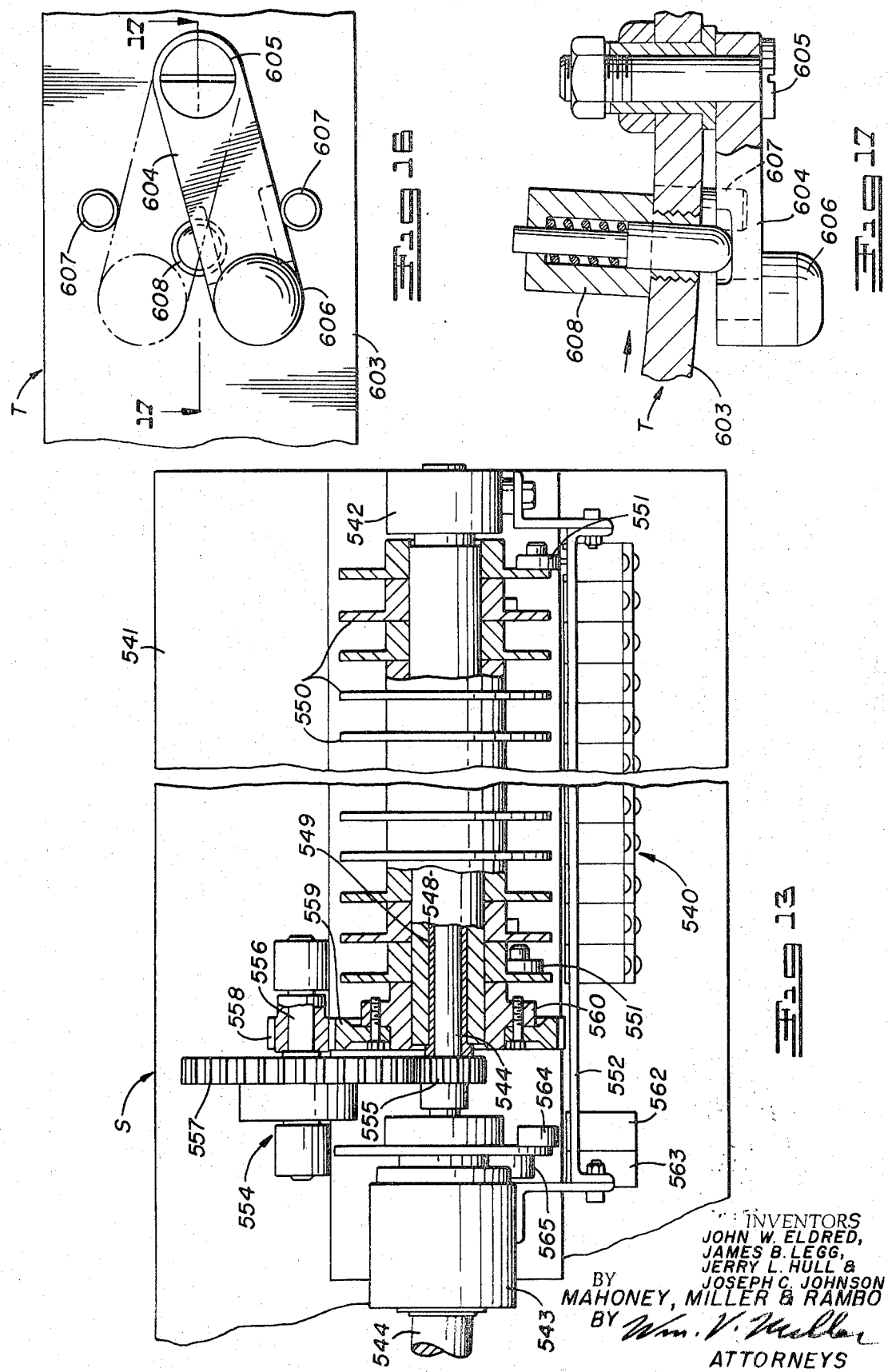

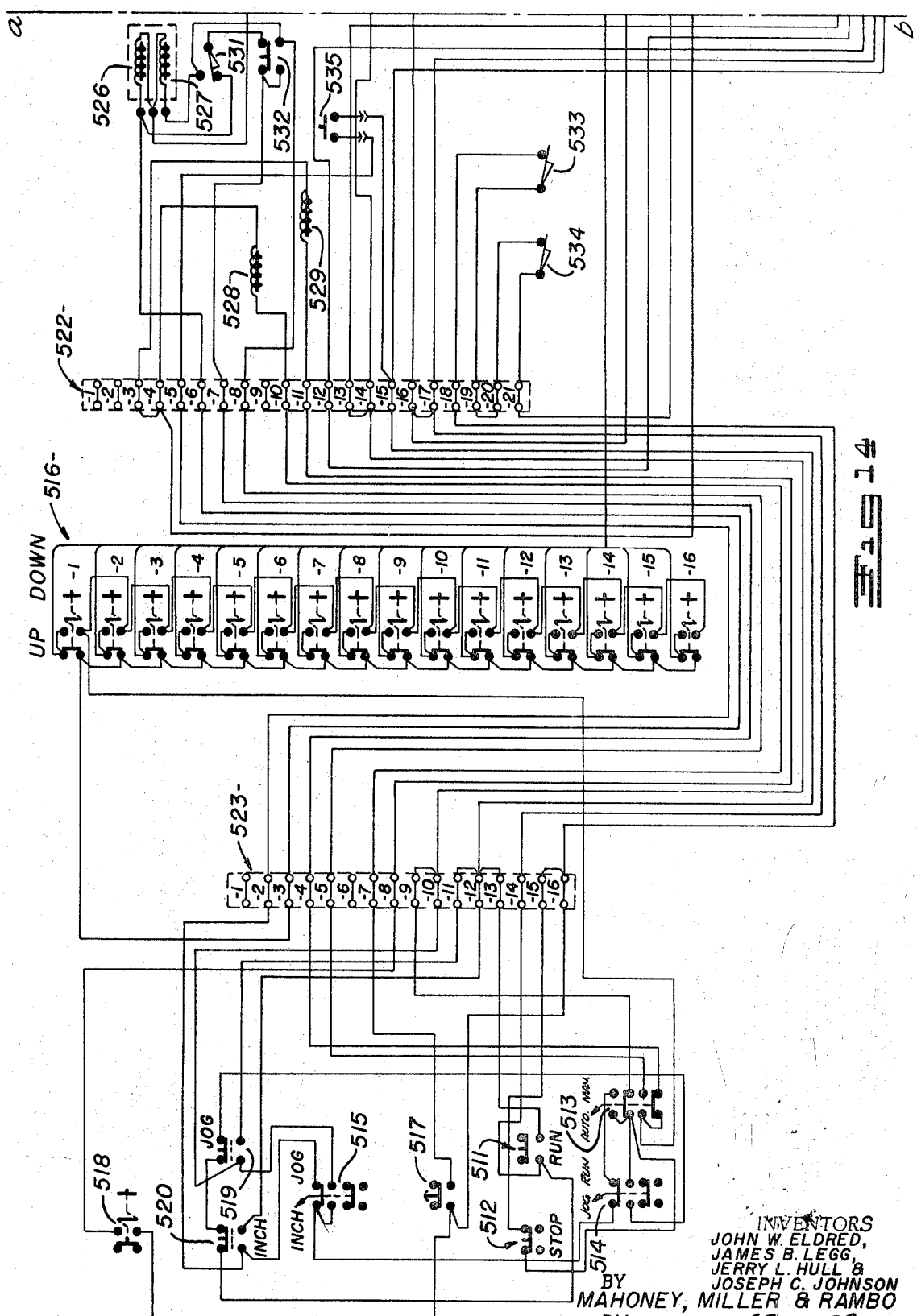

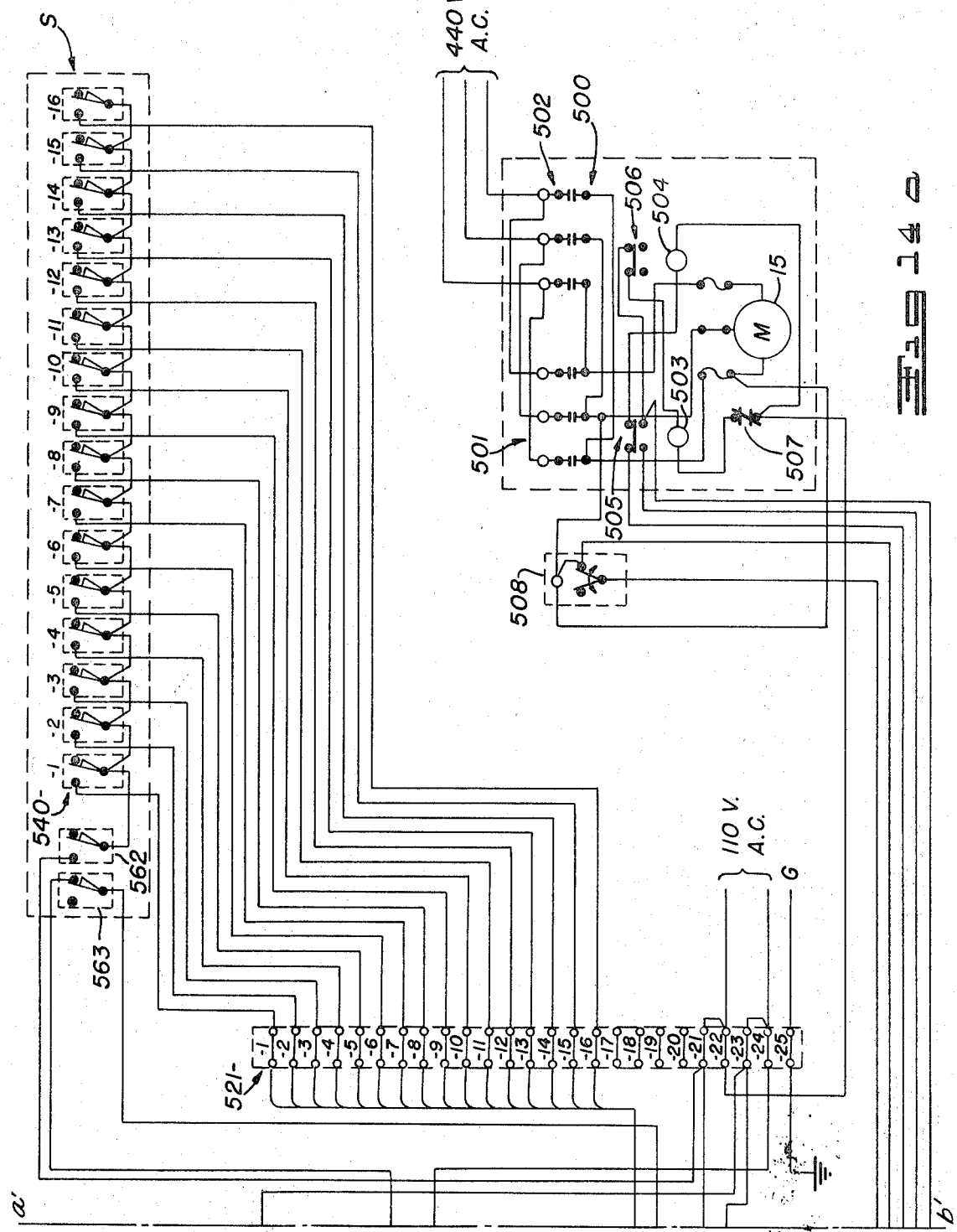

United States Patent Office 3,529,948
Patented Sept. 22, 1970

3,529,948
CONTINUOUS TURRET TYPE GLASS MOLDING MACHINE
John W. Eldred, James B. Legg, and Jerry L. Hull, Columbus, and Joseph C. Johnson, Lancaster, Ohio, assignors to The Eldred Company, Columbus, Ohio, a corporation of Ohio
Filed Nov. 29, 1966, Ser. No. 597,601
Int. Cl. C03b 11/02
U.S. Cl. 65—159
17 Claims

ABSTRACT OF THE DISCLOSURE

A glass molding machine of the continuously rotating turret type which is pneumatically actuated and electrically controlled, has a plurality of plungers cooperating with axially aligned molds and actuated successively by pressing and hold-down cylinders to form molten glass supplied to the molds, has an endless type conveyor for elevating the plungers, and has an endless type conveyor for actuating the lifting valves of the molds after the article is formed.

---

The present invention relates, generally, to the type of continuous glass-forming machine disclosed in the patent to Eldred No. 2,811,815, issued Nov. 5, 1957 but includes many improvements not disclosed in said patent.

The present invention is concerned mainly with an improved cylinder unit and associated control mechanism for controlling the glass-forming plungers in their cooperation with the molds during and immediately after the pressing operation; an improved plunger lifting unit for lifting the plungers after the forming operation; and an improved unit for lifting the valve stems provided in the bottoms of the molds to raise the articles therein preparatory to removal. All of these operations are accomplished at successive intervals during the continuous rotation of the machine in such a manner as to increase its speed and efficiency as compared to the machine of said patent. Also, the present invention provides an electro-pneumatic control system with an improved electrical timing system which not only times and correlates the various operations accurately and efficiently but also makes it possible to render any selected plunger head and associated mechanism inoperative when desired, for example, so it can be repaired or serviced during the continued rotation of the mold table.

Various other objects and advantages of this machine as compared to the patented machine will be apparent as this description progresses.

In the accompanying drawings, there is illustrated a continuous molding machine embodying this invention but it is to be understood that details of this machine may be varied without departing from basic principles of the invention.

In these drawings:

FIG. 1 is a side elevational view of the continuous molding machine of this invention.

FIG. 2 is a plan view of the machine.

FIG. 3 is a detail in enlarged side elevation, partly broken away, taken from the position indicated by line 3—3 of FIG. 2, and showing the cylinder unit comprising the main pressing and hold-down cylinder, the secondary hold-down cylinder, and the tertiary or final hold-down cylinder for cooperation with the plungers.

FIG. 4 is a plan view taken from the position indicated at line 4—4 of FIG. 3.

FIG. 5 is an enlarged, vertical sectional view taken on line 5—5 of FIG. 2 showing the plunger lifting unit with the plunger shown in uppermost position by full lines and lowermost position by broken lines.

FIG. 6 is a vertical sectional view taken on line 6—6 of FIG. 5.

FIG. 6a is an enlarged, horizontal sectional view taken along lines 6a—6a of FIG. 6.

FIG. 7 is a plan view of the plunger lifting unit taken from the position indicated at line 7—7 of FIG. 6.

FIG. 10 is an enlarged, vertical sectional view, partly broken away, taken on line 10—10 of FIG. 2, showing the mold valve stem lifting unit and showing in phantom valve stems in their various vertical positions.

FIG. 11 is a plan view taken from the position indicated at line 11—11 of FIG. 10.

FIG. 12 is an enlarged, vertical sectional view taken on line 12—12 of FIG. 2 and showing the switches and cams of the timing and control system.

FIG. 12a is a vertical sectional view taken on line 12a—12a of FIG. 12.

FIG. 13 is a plan view, partly cut away, taken from the position indicated at line 13—13 of FIG. 12.

FIG. 14 is a schematic view of a portion of the wiring diagram of the machine.

FIG. 14a is a continuation of the diagram of FIG. 14, FIG. 14a matching at the line a'–b' with FIG. 14 at the line a–b.

FIG. 16 is an enlarged side elevational view of a portion of the turret structure showing the trip lever.

FIG. 17 is a horizontal sectional view taken along line 17—17 of FIG. 16.

FIG. 18 is an elevational view taken along line 18—18 of FIG. 2 showing the trip lever actuating mechanism.

FIG. 19 is a vertical sectional view taken along line 19—19 of FIG. 18.

Figure 8:
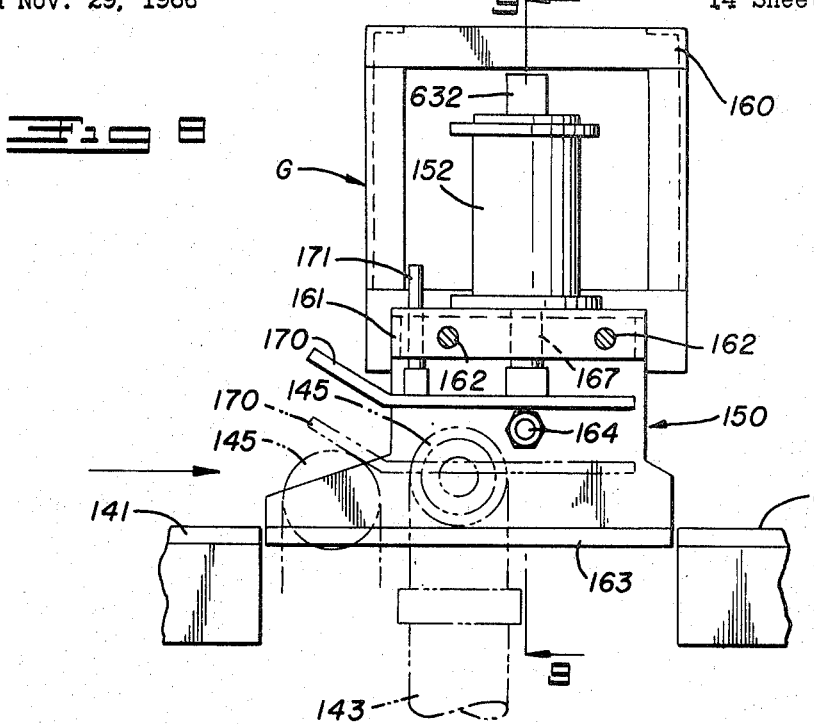
FIG. 8 is a fragmentary side elevational view taken along line 8—8 of FIG. 2 showing the gap-track mechanism and push-down unit for the plunger assemblies P.

With reference, more particularly, to the drawings, especially FIGS. 1 and 2, the molding machine of the present invention as in that of the said patent includes a continuously rotating turret indicated generally by the reference character T. The turret is supported for rotation on a base B which may be semi-portable. The turret includes a revolving mold table upon which is supported the molds M at angularly spaced intervals about its circumference. These molds may be of the split type with sections which swing apart in the manner and under control of suitable means as disclosed in said patent, or they may be solid molds which need not be opened, the latter type being indicated in the drawings attached hereto. Carried by the base section B of this machine is a glass charge deposit or delivery unit D which is disposed at a preselected circumferential position and radially outwardly of the turret T. This delivery mechanism may be identical with that disclosed in said patent and is adapted to introduce into each of the molds M a charge such as a gather or gob of molten glass or the like. The delivery mechanism includes a compound chute or trough mechanism mounted for movement to maintain delivery registry with the molds M as the latter move continuously with the mold table. As in the machine of the previous patent, means is provided for pressing the glass charge in each of the molds and in the present machine comprises pressing plunger head assemblies P disposed above and in vertical registry with the molds M and being mounted on the turret for continuous revolving movement in vertical alignment with the molds. Means is provided for imparting vertical movement to the plungers of these assemblies P to produce at timed intervals controlled descent and ascent of the plungers into and out of the mold cavities of the molds M so as to press and form the charges in the respective molds. This means includes a circular trackway 140 like that disclosed in said patent, formed for the reception of elevation control rollers 145 provided on the upper ends of the glass-pressing plungers 143. This circular trackway comprises a full-circle, upper track 141 and a partial circle lower track 154a with an inclined track 154 (FIG. 3) extending between the two tracks. A gap formed in the upper track permitting the rollers 145 to descend along the inclined track 154 may be bridged by an improved gap-track mechanism 150 which is selectively actuated by a piston and cylinder unit 151 with the structure and operation being further described hereinafter. The gap-track mechanism 150 also includes a push-down cylinder unit 152 (FIGS. 8 and 9) which aids in directing the plunger assemblies P downwardly. Also, the machine includes a fluid pressure cylinder unit C adapted to be operated when the plungers reach their limit of descent, under control of the trackway means, to produce positive pressure on the glass charges within the mold cavities to form the molded articles therefrom. For producing certain articles, such as threaded insulators, the plunger assemblies P may be designed for that purpose and be equipped with rotating means to screw the plunger downwardly and upwardly into and out of the molds M and this means may be the same as the means disclosed in said patent but are not shown herein. The machine, as disclosed in said patent, also includes an automatic ejector which raises the molded articles from the molds M during their continuous revolving movement to permit said articles to be engaged by a discharge or take-off unit F. All operations of the machine are effected automatically in proper sequential order, during the continuous revolving of the turret T.

The drive for the present machine may be similar to that disclosed in said patent and may comprise the prime mover shown as an electric motor 15 which drives a gear box 16 mounted on an extension of the base B. This gear box 16 drives the large ring gear 17 which is fixed to the mold table 20 that is part of the turret T and that carries the molds M and is mounted for rotation about the central stationary column 18 of the turret which is supported in a perpendicular position on the base B. The discharge or take-off unit F may be driven through a drive coupling shaft 19 from the ring gear 17 and the unit F drives the glass charge delivery unit D through a drive shaft coupling 21.

The above description broadly summarizes the structure and operation of the machine disclosed in said patent. The present invention deals mainly with improvements in the following indicated units of the machine.

Figure 9:
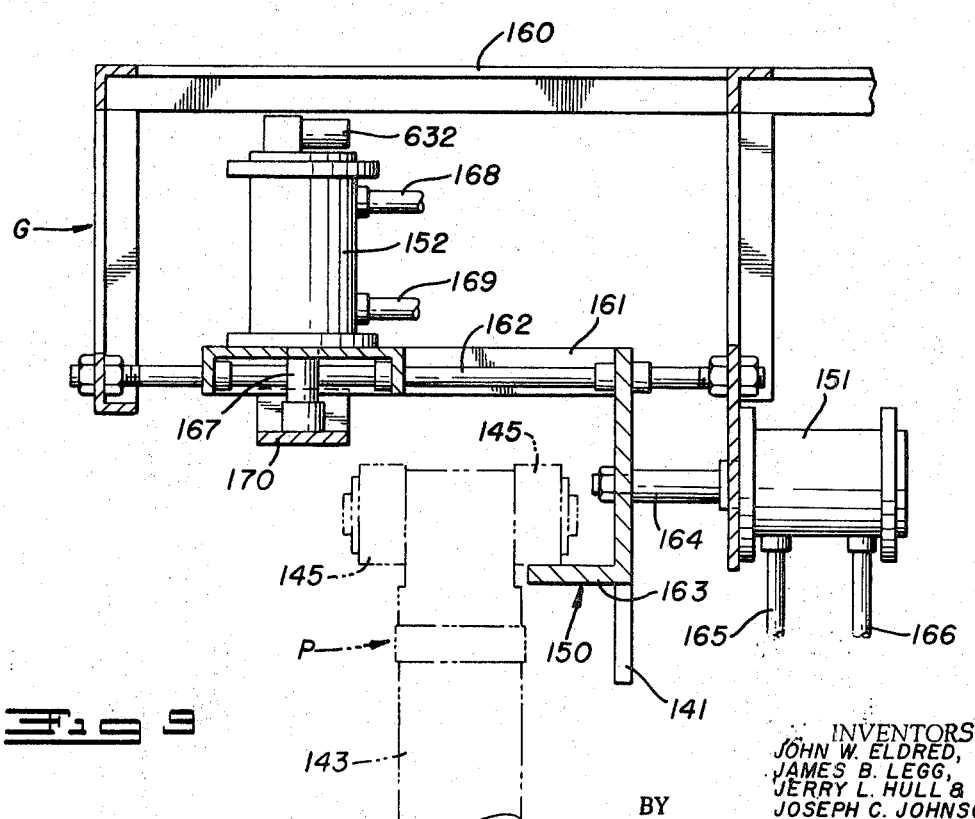
FIG. 9 is a medial vertical sectional view taken along line 9—9 of FIG. 8.

(1) The plunger-lowering, gap track mechanism G shown in FIGS. 2, 8 and 9.

(2) The pressure-applying cylinder unit C shown in FIGS. 1 to 4, including a main pressing and hold-down cylinder, and an additional hold-down cylinder or plurality of cylinders for applying controlled pressure to the forming plunger P during and immediately after it cooperates with a mold M.

(3) The plunger lifting or elevating mechanism L shown in FIGS. 1, 2, 5, 6 and 6a.

(4) The mold valve elevating mechanism V shown in FIGS. 1, 2, 10 and 11.

(5) The electro-pneumatic control system with the timing and control unit S shown in FIGS. 12 and 12a, 13, 14 14a, and 15.

It will be noted from FIG. 2 that the units G, C, L and V are located at successive angularly spaced positions counterclockwise around the turret T adjacent the circumference thereof and between the glass charge delivery unit D and the take-off or discharge unit F. The unit S may be positioned at any suitable location about the turret.

The plunger-lowering gap track mechanism 150 (shown in detail in FIGS. 8 and 9) is carried just ahead of the press cylinder unit 220 by a structural framework 160 projecting radially outward from and secured to the main frame of the machine. A reciprocable carriage 161 is supported for horizontal movement by a pair of guide rods 162 suspended from the framework 160 to traverse the area of the gap in the upper level track 141. A depending track section 163 mounted on the carriage 161 is adapted to bridge the gap in the upper level track 141 and support the inboard roller 145 of the plunger assembly P when at radially outboard position but may be radially displaced to a relatively inboard position where the rollers 145 will be permitted to descend along the inclined track section 154. Movement of the carriage 161 to the desired position is effected by selective operation of the double-acting piston and cylinder unit 151 having a piston rod 164 mechanically connected to the carriage 161. Fluid conduits 165 and 166 connected with the cylinder 151 are connected in the pneumatic control circuit.

The push-down cylinder unit 152 also comprises a double-acting piston and cylinder having a piston rod 167 and fluid conduits 168 and 169 for connecting in the pneumatic control circuit. The cylinder 152 is secured to the carriage 161 relatively outboard from the gap track section 163 for vertical reciprocating movement of the piston rod 167. Secured to the lower end of the piston rod 167 is a pressure shoe 170 which is adapted to engage the rollers 145 at the outboard side of the plunger assemblies P when the carriage 161 is displaced radially inward. A guide rod 171 attached to the leading end of the pressure shoe 170 and engaged by a guide bushing (not shown) on the carriage 161 assists in maintaining proper alignment of the shoe. When displaced radially inward, the cylinder unit 152 is operated to extend the pressure shoe 170 into the horizontal path of the rollers 145 and direct the rollers downwardly. The cylinder provides a resilient force exerting a downward pressure on the rollers 145.

The cylinder unit C shown in FIGS. 1 to 4 comprises the main pressing and hold-down cylinder 220, the secondary hold-down cylinder 400 and the final hold-down cylinder 401, arranged sequentially in the counterclockwise direction of rotation of the turret and at fixed angular positions relative thereto.

The cylinder 220, as in the previous patent, is mounted on the radial frame member 31 and will apply pressure to the plungers 143 at the time the rollers 145 thereof reach a level slightly lower than the lower section 154a of the trackway 140, as indicated in FIG. 3, after moving down the sharply declining guide track section 154 to that lower level. At this time, the rollers 145 of the respective plunger are received on an arm 210, which is pivoted at 210' on the section 154, and are engaged from above by the pressure shoe 212.

The pressure shoe 212 is connected for vertical movement with the piston rod 216 which is carried by a piston 218 that is mounted for vertical slidable movement in the cylinder 220. Fluid pressure flow into and out of the cylinder is controlled by means of the lines 222 and 225. The inflow and outflow of fluid, such as compressed air, is controlled, as will be explained later, to produce downward movement of the piston 218 and the shoe 212 to apply a downward thrust to the associated plunger 143 at the time the rollers 145 thereof are at substantially the lower level of the trackway 140, assuring positive displacement of the molten glass in the cooperating mold M. It will be noted that when the rollers 145 reach the bottom of the inclined trackway section 154, the rollers 145 will engage the foot section 211 of the bracket 210 which is pivoted at its lower end at 211a, by a pin and slot pivot, to the shoe 212 so that the plunger 143 is supported at this time by the piston rod 216 of the pressure cylinder 220.

After the cylinder 220 acts on a plunger 143 to force its lower end into the charge of glass in the cooperating mold M, the plunger is next subjected to the action of the secondary hold-down cylinder 400 which is located radially inboard of the cylinder 220 and just beyond it angularly in the direction of rotation of the turret T, as indicated in FIG. 2. The details of this unit are indicated in FIGS. 3 and 4 and it comprises a double-acting, vertically disposed cylinder 402 mounted on the strut 403 which is rigidly secured to radially extending frame members 30 and 31 of the machine. Fluid supply for the cylinder 402 is controlled by the lines 404 and 405 connected thereto. A piston rod 406 depends from the cylinder 402 and carries a shoe 407 similar to the shoe 212. After the pair of plunger rollers 145 move out of contact with the shoe 212, the inboard roller thereof will engage the shoe 407 which, in its normal position, is slightly above the pressing position of the shoe 212 as indicated in FIG. 3. Pressure is then applied to the cylinder 402 to cause the shoe 407 to exert a downward thrust on the plunger and hold its lower end in pressing position relative to the glass in the cooperating mold M. This hold-down cylinder unit 400 will hold the plunger down for a selected period during continued rotation of the turret T after which that plunger may be subjected to another hold-down cylinder unit 401 but, as previously indicated, one or any desired number of hold-down cylinders may be provided.

It will be noted from FIG. 2 that this unit 401 is located radially outboard of the unit 100 and the unit 220 and is beyond the unit 401 in the direction of rotation of the turret T. The details of this unit are indicated in FIGS. 3 and 4. The unit comprises a cylinder 408 vertically disposed and rigidly carried by the strut 31a of the machine frame. This unit is similar to the unit 400 and the piston 409 which slides vertically in the cylinder is provided with a depending rod 410. The supply of pressure to the cylinder 408 is controlled by the lines 411 and 412. The lower end of the piston rod 410 has shoe 413 rigidly carried thereby and this shoe is similar to the shoe 407. After the outboard roller 145 of the plunger leaves the shoe 407, the inboard roller 145 of that plunger engages the shoe 413, as indicated in FIG. 3. It will be noted that the shoe 413 is slightly higher than the shoe 407 in its starting position. Thus, the shoes 212, 407 and 413, in their uppermost positions, are in slightly higher successive positions in the direction of rotation of the machine, as indicated in FIG. 3. The turret T travels angularly relative to these shoes which are at fixed angular positions on the stationary machine frame. As the roller 145 is engaged by the shoe 413, fluid pressure supplied to the cylinder 408 is controlled to cause the shoe to continue to hold down the plunger 143 in the molded article in the mold M. The pressure is released completely before the rollers 145 of that plunger engage the lower track section 154a at which time the outboard roller 145 will have been moved off the shoe 413 by the continued rotation of the turret.

Thus, with this cylinder arrangement, the charge of glass is firmly pressed to cause it to conform to the shape of the mold cavity, is held in the mold cavity until it sets sufficiently to retain its molded shape, and the molding pressure is released. All of these operations are accomplished during the continued movement of the turret without undue drag.

In this improved machine, instead of having a cam track section, equivalent to the section 155 of the patented machine, for raising the plunger assembly P after the glass forming operation, the lifting unit L is provided. This will raise the plunger without the resulting drag friction caused by the rollers 145 moving up the inclined raising section or elevating ramp of the track. Instead of the elevating ramp in the track, there will be a gap between the lower section 154a and the upper section 141, as indicated in FIGS. 5, 6 and 7, and at this gap, the unit L will be located, this position being angularly displaced in a counter- clockwise direction beyond the pressure cylinder unit 401, as indicated in FIG. 2. There is also a gap in the upper track section 141 at this point which is normally bridged by a gravity-operated track bridge 156 as in the patented machine.

This unit L is an endless type lift conveyor with its operative flights supported tangentially relative to the circular path of movement of the revolving plungers 143 on the turret T, as indicated in FIG. 2, so that the successive flights will be engaged by rollers 145 of successive plungers 143 moved into cooperation therewith by rotation of the turret T. The roller-engaging flights 415 are carried at vertically spaced intervals between a pair of sprocket-type conveyor chains 417 which are disposed in angularly-spaced, parallel relationship. The lower pair of idler sprockets for the chains 417 are carried by an idler shaft 418 and the upper pair of drive sprockets are keyed to a drive shaft 419 which is continuously driven by a gear and shaft drive 420 from the main drive of the machine. The sprocket shafts are supported between the depending support bars 421 which are disposed in angularly spaced, parallel relationship outboard of the path of the revolving movement of the plungers 143. These bars are rigidly dependent from a rigid frame 422 extending horizontally outwardly from the frame construction 146 suspended from the top struts 33 of the main frame of the machine.

The flights 415 embody angle members which have one of their flanges bolted to the chains 417 and the other outwardly extending roller-engaging flange provided with a curved edge 423 concentric with the turret T when it is on the inner run of the elevating conveyor. When on this inner run, each flight 415 is braced by two pairs of rollers 424 disposed towards the opposed ends of the flight and secured to the vertical flange thereof. These rollers operate in a pair of vertical channel guides 425 attached to the vertical inner surface of a support plate 426 extending between the bars 421 and being rigidly secured thereto. This guide structure will prevent both outward and angular movement of the flights 415 as the rollers 145 roll therealong.

The drive for the elevating conveyor is such that at the time the rollers 145 of a plunger 143 move off the lower track section 154a, one of the flights 415 will be at the proper level to receive and support the outboard roller 145 and lift it as it rolls along that flight during the continued revolving movement of the turret T. By the time the roller 145 moves angularly along the flight to the end of the upper track section 141, that flight will be at the proper upper level for the roller to roll off the flight and onto the upper track section 141. Thus, the plunger 143 which carries the roller 145 will be lifted to its original starting upper position vertically spaced above but in vertical axial alignment with the mold M with which it cooperates. This lifting of the successive plungers 143 after the molding operation is accomplished without drag friction which would be caused by the rollers riding up a cam track as in the patent structure.

After the plunger assemblies P are revolved with the turret T past the lifting unit L, the molds M, from which the lower ends of the plungers 143 have been withdrawn, move angularly into cooperation with the valve elevating unit V, which is beyond the unit L, in a counterclockwise direction, as shown in FIG. 2. The details of this unit are shown in FIGS. 10 and 11.

As explained in detail in said patent, each mold M is provided with an ejector mechanism which includes a lifting valve that has a stem 45 extending downwardly through the bottom of the mold. However, in this machine, the roller 261 is disposed slightly above the lower extremity 431 of the stem and this lower extremity is blunt to facilitate engagement by the valve lift unit V. After the pressing operation, the continuous movement of the mold table 20 moves the valve stems successively into cooperation with the unit V which will lift the valve stems and the formed articles in the molds M for engagement by the take-off or discharge unit F. This unit V, as indicated in FIG. 2, is located angularly between the plunger lifting unit L and the discharge unit F. It is also driven from the ring gear 17 and the drive is accomplished through a gear box 429.

The unit V is mounted on an extension 38 projecting outwardly from the base B. It comprises an endless type elevator conveyor 430 which is disposed beneath the path of the revolving movement of the valve stems 45 and normally is held in an inclined position for engagement by the lower ends 431 of the valve stems 45. The conveyor 430 comprises parallel sprocket chains with the stem-engaging flights or pins 432 extending transversely therebetween. The chains are carried by upper idler sprockets on a shaft 433 and by lower drive sprockets on a shaft 434. These shafts are supported by the parallel bars 435 and these bars are pivoted for vertical swinging movement about the drive shaft 434. This shaft 434 is supported by a support frame 436 spaced above the support 38 at a set position which is vertically adjustable. One of the bars 435 is provided with an integral rocker arm 437 which has its outer end coupled by a clevis 438 to the outer end of a piston rod 439 which extends from a cylinder 440. The other end of this cylinder is pivoted at 441 to a support bracket 442 rigidly upstanding from the support frame 436. The cylinder 440 is a double-acting cylinder which receives fluid pressure at one end, whenever the machine is in operation, through a line 443. This pressure will act to move the piston in the cylinder to retract the piston rod 439 and thereby swing the entire lifting conveyor 430 to the valve-stem engaging position shown in FIG. 10. The cylinder is provided with a vent valve 444 at its opposite end which retards the movement of the piston rod 439 outwardly whenever the associated control valves operate to permit extension of the piston rod so as to allow the elevator conveyor 430 to swing slowly downwardly into horizontal position if a lifting valve encounters excessive resistance to its upward movement.

The drive shaft 434 of the conveyor is driven continuously when the machine is operating by a chain and sprocket drive 445 which is driven by the gear box 429. Thus, the conveyor 430 is driven continuously in timed relationship to and by movement of the mold table 20.

The frame 436 is adjustable relative to the support 38 so as to vertically adjust the elevating conveyor 430 in accordance with changes of molds on the mold table 20 which might change the elevation of the lower ends 431 of the valve stems. Thus, the frame 436 is mounted on a pair of vertical guide pins 446 by means of guide collars 447 carried at opposite sides of the frame 436, the pins upstanding from the support 449 at opposite sides of the frame. These pins pass upwardly through elongated slots 448 formed in a flat adjustable plate 449. This plate 449 slidably rests on the support 38 and is disposed beneath guide strips 450 which overlap the plate at opposed edges. The plate 449 is adjustable relative to the member 38 by means of an adjusting screw 451 which is rotatably anchored at 452 to the support 38 and is threaded through a nut 453 carried by the plate 449. The plate 449 carries four inclined planes 454 disposed on the upper surface thereof and beyond and behind the pair of guide pins 446 which engage the four rollers 455 carried in cooperative positions on the frame 436. Thus, when the plate 449 is adjusted by the screw 451, the inclined planes 454 and rollers 455 cooperate to move the frame 436 vertically on the guide pins 446. This will position the conveyor 430 at a proper level for cooperation with the valve stems 45.

As the mold table 20 rotates and moves the stems 45 into cooperation with the elevator conveyor 430, the lower blunt end 431 of each valve stem will be engaged by one of the transverse pins 432 of the conveyor, as shown in FIG. 10. In order to prevent sagging of the conveyor during this lifting action, a back-up plate 463 is provided behind this run of the conveyor. This back-up plate 463 extends transversely between the bars 435 and substantially the complete distance between the upper and lower sprockets of the conveyor. It is rigidly secured to the bars and the pins 432 will slide over this plate as they travel along the upper run of the conveyor. The conveyor movement will be timed to coincide with the travel of the valve stem along with the mold table so that the valve stem will merely be lifted by the conveyor pin 432. This lifting action will push the valve stem upwardly through the bottom of the mold to elevate the formed article therein. By the time the article is elevated properly for removal by the take-off unit F, the roller 261 will be in cooperation with a shoe 456 which is carried by an upstanding member 456a on the frame 436. The shoe will be at a level corresponding to the upper end of inclined conveyor 430 when it is held in its uppermost position by the cylinder 440. It will be noted in FIG. 11 that this shoe extends outwardly over the conveyor 430 and that the roller 261 is inboard of the stem 45. Consequently, the roller 261 will roll onto the upper surface of the shoe 456. Continued movement of the mold table 20 will carry the roller into association with a guide track 457. This guide track 457 has a horizontal section 458 level with the shoe 456 and a sharply inclined section 459. The roller 261 of the valve stem will roll along the horizontal section 458 for a sufficient period to permit engagement of the take-off unit F with the raised article to remove it from the mold M and then will move down the inclined part 459 of the track to allow the mold valve stem 45 to slide downwardly to its original position so that the mold will then be ready to receive another charge of glass. It will be noted from FIG. 11 that the track 457 is curved to correspond to the circular path of movement of the mold valve stems which is indicated by the arrows. To further insure proper positioning of the roller 261 over the track 457, the track is carried on a vertical pivot pin 460 supported by the frame 436. Cooperating with this pivot pin is a torsion spring 461 which will swing the track inwardly towards the center of the mold table 20 with which the track is concentric. An adjustable stop 462 is provided at the pivot 461 to accurately position the track 457 relative to the center of the mold table 20. It will be noted from FIG. 11 that the outer edge of the shoe 456 is a continuation of the curve of the track 457.

It will be apparent that with this arrangement, the valve stems 45 of the successive molds M will be elevated during the continuous movement of the mold table to raise the formed articles upwardly of the mold cavities so that the formed articles will project from the molds and can be engaged by the take-off F. This elevation is accomplished without drag friction since the valve stems are actually elevated by the elevating conveyor 430 without the engagement of cam followers over cam surfaces which would produce undue drag and friction.

The operation of the various improved units in connection with the entire machine has been discussed above and need not be repeated at this point. However, according to the present invention, there is provided an electropneumatic control system with the unit S previously mentioned which serves to time and correlate all the operations of the machine. This unit S is located just beyond the mold charge supplying or delivery unit D, as indicated in FIG. 2. It is driven by a shaft 475 from the ring gear 17. The details of this unit along with the electric circuit and pneumatic circuit are illustrated in FIG. 12–15, inclusive.

Figure 15:
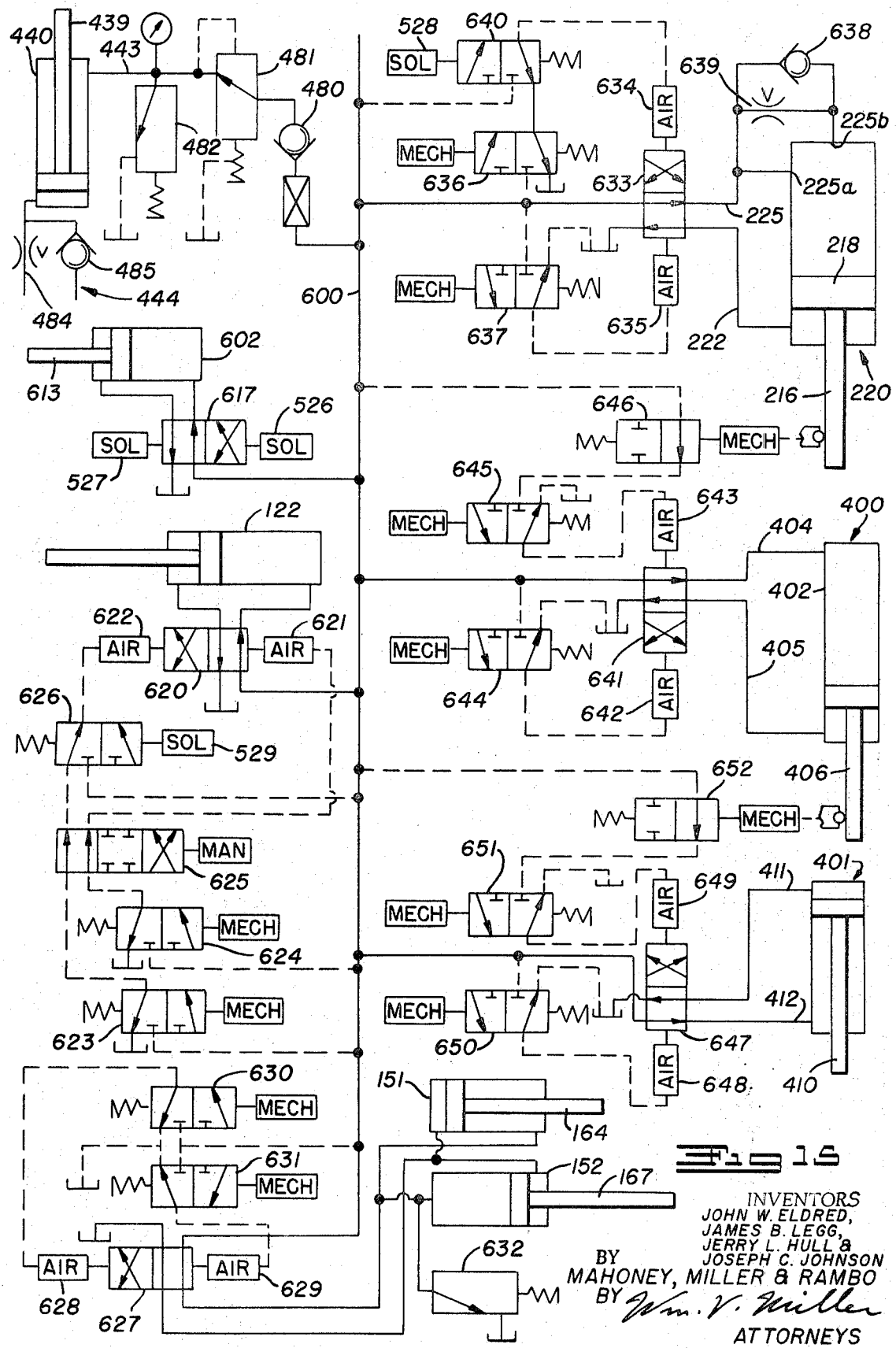
FIG. 15 is a schematic diagram of the pneumatic circuit of the machine.

The pneumatic portion of the control system provided by this invention is illustrated schematically in FIG. 15 with two components thereof which were not included in the aforesaid patent being shown in detail in FIGS. 16, 17, 18, and 19. The pneumatic circuit is connected to a suitable source of pressurized fluid (not shown) by a main supply conduit 600. In this embodiment, the pressurized fluid is air, although other fluids may be utilized and it is to be understood that the various return conduits, ports and vents are open to the atmosphere rather than connected to a fluid supply reservoir, as would be the case with a fluid of the liquid type. Previously described actuating piston and cylinder units of this machine are diagrammatically illustrated along with piston and cylinder units 122 and 602 for actuating a portion of the delivery chute and positioning of trip levers, respectively. As explained in said patent, a portion of the delivery chute is adapted to be selectively positioned by piston and cylinder unit 122 to either guide a gob of molten glass to the mold or to guide the gob to a waste receptacle. In the former case, the delivery chute is termed as being placed in an IN position whereas in the latter it is termed as being placed in an OUT position. The piston and cylinder unit 602 is associated with a mechanism to be described which is operative to control the position of trip levers that actuate several of the control valves of this pneumatic circuit.

Mounted on a circular structural member 603, which is part of the turret T, in uniform, angularly spaced relationship are sixteen actuating members in the form of trip levers 604 with each lever being associated with a respective plunger assembly P, as shown in FIG. 1. A typical trip lever 604 is shown in detail in FIGS. 16 and 17 and is seen to comprise a lever arm pivotally mounted on the structural member 603 by a pivot pin 605 for swinging movement in a vertical plane. Carried by the lever 604 at a point remote to the pivot pin 605 is a cam follower 606 adapted to engage an actuating member of several of the control valves. Two pins 607 secured to the structural member 603 in vertically spaced relationship and projecting a distance outwardly therefrom are adapted to engage the trip lever 604 and restrict further movement thereof. A spring-biased detent mechanism 608 carried by the structural member 603 is also cooperatively engageable with the respective lever 604 in lower operating position shown in full lines in FIG. 16 or in an upper, non-operating position as shown in broken lines. The lever 604 being placed in either selected position is maintained in that position by the detent mechanism 608.

A trip lever control mechanism 610 with which the piston and cylinder unit 602 is associated is shown in detail in FIGS. 18 and 19 with the mechanism being located as shown in FIG. 2 to selectively position the trip levers 604 associated with each plunger assembly prior to the start of a molding cycle for that particular station. This mechanism 610 is supported on the framework of the machine in fixed relationship to the turret T by a support column 611 with the piston and cylinder unit 602 fixedly mounted on a bracket 612 for reciprocating movement of the piston rod 613 in a vertical plane. Slidably supported by the bracket 612 in suitable guides is a slider 614 which is attached to the piston rod 613. The slider 614 is formed with two opposed, relatively divergent cam surfaces 615 and 616 which are adapted to successively engage the cam followers 606 of the trip levers 604, as diagrammatically illustrated, as the turret T rotates. With the slider 614 in the lowermost position as shown in FIG. 18, the cam surface 615 engages the cam followers 606 and assures that the trip levers 604 will be placed in an operating position. Upon retraction of the piston rod 613, the cam surface 616 will be brought into operation and place the trip levers 604 in the non-operating position. Control of the operation of the piston and cylinder unit 602 is effected by a two-position, four-way valve 617 of the electric solenoid type which is mounted on the top of the cylinder and is in fluid communicating relationship with the cylinder and the fluid supply conduit 600, as shown in FIG. 15. Momentary energization of the respective electric solenoids 526 or 527, which are shown connected in the electric circuit in FIGS. 14 and 14a, will place the spool of the valve 617 in the selected position.

The piston and cylinder unit (440 and 439, FIGS. 10 and 11) associated with the lifting conveyor 430 is normally maintained in an upwardly inclined position through pressurization of the cylinder 440 from the main fluid supply conduit 600 through the conduit 443. Interposed in this conduit 443 is a check valve 480 which prevents a reverse fluid flow to the conduit 600 and a pressure reducing valve 481 which reduces the pneumatic system pressure to a value which is required to maintain a predetermined force on the piston rod 439 for the specific components utilized. A pressure relief valve 482 is connected to the conduit 443 and is set to open at pressure slightly above the normal reduced pressure in this conduit so that, if the conveyor 430 is forced downwardly, the resultant pressure increase will open the valve 482 and permit the fluid to flow out of the cylinder 440. Air is admitted to the opposite end of the cylinder 440 through the vent valve 444. This vent valve includes a choke restriction 484 that permits restricted fluid flow into the cylinder and a check valve 485 that permits unrestricted fluid flow from this end of the cylinder. As soon as any excess force is removed from the piston rod 439, the piston rod will automatically retract and again raise the lifting conveyor 430 to its normal inclined position.

Sequential operation of the several pneumatically actuated elements of this machine is effected primarily by selective operation of respective control means at angularly spaced positions about the turret on the fixed frame of the machine. These control means are illustrated as mechanically operated poppet valves included in that portion of the pneumatic circuit associated with a particular element. These poppet valves are of a two-position, directional type that are spring biased to a fluid-flow obstructing position. Each of these valves will be identified in the following brief description of the pneumatic circuit and operation of the several elements as related to a molding process.

Positioning of the delivery chute to either an IN or OUT position is effected by a piston and cylinder unit 122, as previously indicated, with the operation being controlled by a two-position, four-way, spool-type valve 620 which is operated by two air solenoids 621 and 622 to the selected position. Pressurization of the air solenoids 621 and 622 is controlled by respective poppet valves 623 and 624 which are disposed in vertically aligned relationship on the stationary structural framework of the machine at a point preceding the delivery station as diagrammatically indicated in FIG. 2. Valve 623 is disposed vertically above valve 624 and will be actuated by a trip lever 604 of a respective passing plunger assembly P which passes this station and is placed in the nonoperating position thereby pressurizing air solenoid 621 to displace the spool of valve 620 to a position where the piston rod of the unit 601 will be retracted to place the delivery chute section in the OUT position. If the trip lever 604 is placed in the operating position, valve 624 will be operated thereby pressurizing air solenoid 622 resulting in extension of the piston rod to place the delivery chute in the IN position. Interposed in circuit with the pilot pressure lines to the air solenoids 621 and 622 is a three-position, four-way reversing and control valve 625 of the manually-operated type which may be selectively positioned to reverse the pressurization of the air solenoids as determined by the poppet valves 623 and 624. Positioning valve 625 in the center position will obstruct fluid flow to the air solenoid 621 and 622 and thereby prevent further operation of the valve 620. As a further safety feature, an electric solenoid actuated, two-position, directional override valve 626 is interposed in the pilot pressure line to air solenoid 621 and may be selectively operated through energization of the solenoid 529 (see FIGS. 14 and 14a) to override the other control valves to pressurize solenoid 621 thereby placing the spool of valve 620 in a position to retract the piston rod of the unit 122.

Subsequent to delivery of a gob of molten glass to a mold, the respective plunger assembly P must be lowered preparatory to operation of the pressing cylinder 220. The plunger assembly P is lowered through operation of the gap track mechansm 150 to permit the rollers 145 to descend from the upper track section 141 along the inclined track 154 to the level of the lower track section 154a. Operation of the gap track mechanism 150 is effected by the double acting, piston and cylinder unit 151 which is controlled by the two-position, four-way valve 627 having a spool selectively displaceable to the desired position by the air solenoids 628 and 629. Two poppet valves 630 and 631 are connected to control the respective solenoids 628 and 629 with the poppet valves being vertically aligned and supported at the indicated point on FIG. 2 with valve 630 above valve 631. Thus, with the trip level 604 placed in the operating position, valve 631 will be actuated to pressurize air solenoid 629 thereby positioning the spool of valve 627 to retract the piston rod of the unit 151 and open the track gap permitting the rollers 145 to descend along the track 154. Placing the trip lever 604 in the non-operating position will result in actuation of poppet valve 630 and pressurization of solenoid 628 to position the spool of valve 627 to cause the piston rod of unit 151 to extend and close the track gap thereby preventing the plunger assembly P from descending during that particular cycle of operation.

Associated with the gap track cylinder unit 151 is the push-down cylinder unit 152 which is simultaneously controlled by the operation of valve 627. This unit includes a double-acting cylinder which is oppositely connected to the cylinder of unit 151 resulting in displacement of the piston rod 167 in a direction opposite to that of the unit 151 for a particular position of the valve 627. A pressure relief valve 632 is connected to the cylinder of unit 152 at the end opposite the rod end to relieve pressure in the event that the plunger assembly P fails to drop.

Operation of the pressing cylinder 220 is controlled by a two-position, four-way valve 633 having a spool which may be selectively displaced by two air solenoids 634 and 635. Two poppet valves 636 and 637 control the pressurization of the air solenoids 634 and 635 to effect the upward or downward movement of the piston rod 216. These poppet valves 636 and 637 are relatively angularly displaced, as indicated in FIG. 2, with the valve 637 being actuated first to extend the piston rod 216 and valve 636 is then actuated to retract the piston rod, provided the trip lever 604 of the respective plunger assembly which moves into association therewith has been placed in operative position. Actuation of valve 637 pressurizes air solenoid 635 thereby positioning the spool of the valve 633 to extend the piston rod 216 of the press cylinder 220. Subsequently, valve 636 is operated to pressurize air solenoid 634 thereby positioning the spool of the valve 633 to retract the piston rod 216 of the press cylinder 220. If trip lever 604 is in its inoperative position, neither of the valves 637 and 636 will be actuated. The pressure supply line 225 is preferably connected to the head end of the cylinder 220 by two ports, 225a and 225b, one of which (225a) is formed in the cylindrical wall adjacent the head end at a point where the piston 218 will be capable of blocking the port and preventing fluid flow therethrough. The other port 225b is formed in the head end wall and cannot be closed by the piston 218. Interposed in the branch of the fluid supply line connecting with the port 225b are a shunt connected check valve 638 and a variable choke restriction 639. The check valve 638 is connected to permit free flow to the cylinder 220 but will block fluid flow from the cylinder. Thus, when the piston 218 has retracted to a point where the port 225a is blocked, the choke restriction 639 will retard fluid flow from the cylinder and provide an air cushion.

A two-position directional valve 640 is interposed in the pilot air line to the air solenoid 634 and is operable to override either poppet valve 636 or 637 in controlling valve 633 and is effective to return the piston rod 216 to an UP position. Valve 640 is spring biased to the indicated position and is actuated by energization of an electric solenoid 528 connected in the electric circuit of FIGS. 14 and 14a.

Continued molding pressure is maintained on the plunger assemblies P by operation of the hold-down cylinder 400 and its associated piston rod 406. This double-acting cylinder 400 is controlled by a two-position, four-way valve 641 having a spool actuated by two air solenoids 642 and 643. Timed control over pressurization of the air solenoids 642 and 643 is effected by the respective poppet valves 644 and 645 which are relatively angularly displaced, as shown in FIGS. 1 and 4 and will be actuated like the valves 636 and 637 provided the trip lever 604 of the respective plunger assembly R is in its operative position. It will be noted that valve 645 will be actuated prior to actuation of valve 636 which results in extension of the hold-down piston rod 406 prior to retraction of the pressing cylinder piston rod 216. Interposed in the pilot air line to the air solenoid 643 is a two-position shut-off valve 646 which is spring biased to a position preventing fluid flow to the air solenoids 643. With valve 646 in the OFF position, pressurization of solenoid 643 is prevented even though the poppet valve 645 may be actuated. The shut-off valve 646 is mechanically actuated by cam means mechanically coupled with the piston rod 216 of the press cylinder 220. Thus, unless the piston rod 216 is extended, valve 646 will not be actuated and will prevent extension of the hold-piston rod 406.

Control over operation of the hold-down cylinder unit 401 is effected by a pneumatic circuit similar to that associated with the hold-down cylinder unit 400. This pneumatic circuit includes a control valve 647 actuated by air solenoids 648 and 649 through operation of the respective poppet valve 650 and 651 which are actuated like the valves 636 and 637 and the valves 644 and 645 provided the trip level 604 of the respective plunger assembly P is in its operative position.

These poppet valves are diagrammatically located in FIG. 2 in relatively angularly displaced positions. Extension of the piston rod 410 is mechanically interlocked to operation of the hold-down cylinder unit 400 by a mechanically operated, two-position shut-off valve 652 which is cam-operated through mechanical interconnection with the piston rod 406. Extension of piston rod 406 is necessary to actuate valve 652 to permit fluid flow to the air solenoid 643 and result in extension of piston rod 410.

In accordance with this invention, the molding machine is further controlled by an electric circuit and control mechanism which includes the timing and control unit S operating in conjunction with the pneumatic circuit. Included in this electric control circuit, which is shown in FIGS. 14 and 14a, is a starter controller 500 which is connected in circuit with the main drive motor 15 and is selectively operable to connect the drive motor to a suitable source of electrical power. This starter 500 is shown as being of the reversing type to permit reversal of current flow in the motor to effect dynamic braking in certain modes of operation. In the present embodiment, the motor 15 is of the three-phase type operating on alternating current and reversal may be effected through changing of the line connections which is accomplished by the two sets of three-phase line contactors 501 and 502 which are actuated by the respective forward and reversing solenoids 503 and 504. Respective sets of auxiliary contacts 505 and 506 included in the starter 500 are operative to form a holding circuit for the forward solenoid 503. Also included in the starter controller 500 is a thermal overload relay having the normally closed contacts 507 connected in circuit with the forward and reverse solenoids 503 and 504.

Other manually operable control switches and selectors are mounted in a control panel 510 which is supported on the molding machine structure. These switches and controls include the machine START and STOP push button contactors 511 and 512, the operating mode selector switches 513, 514 and 515, and the manual plunger control contactor switches 516. The illustrated molding machine is provided with sixteen plunger assemblies P located at their respective stations and the plunger 143 of each may be controlled in its movement by a respective manually operated, electrical contactor switch 516. In the drawings, each manual contactor switch 516 is further identified with its respective hyphenated numeral 1 through 16. An emergency contactor switch 517, a delivery contactor switch 518 and two intermittent motion contactors 519 and 520 are also mounted on the control panel 510. Interconnection of the several controllers, switches and contactors of this apparatus is accomplished by means of the terminal connector blocks 521, 522 and 523 which are also mounted within the control panel 510. Each set of terminals of the respective connector blocks 521, 522 and 523 are identified by the respective hyphenated numerals to further facilitate following of the circuit diagram.

Other elements of the control circuit, including the timing and control unit S, which are not mounted in the starter controller 500 or the control panel 510 are the trip lever control valve solenoids 526 and 527, the press cylinder valve solenoid 528 and the delivery valve solenoid 529. Other components associated with the circuit include an indicating limit switch 531 associated with the take-out station of the machine, an override contact 532, respective clutch and mold lock limit switches 533 and 534, and an auxiliary contactor 535 which is connectable to the circuit by means of an elongated, flexible cable. The switch 531 is so located (FIG. 1) that immediately as the formed article is taken out of the mold it contacts and actuates the switch. If the limit switch 531 is not actuated by removal of a molded article at the take-off unit F, the solenoid 526 will be energized and the trip lever control mechanism 610 will be actuated to return the trip lever 604 for the respective plunger assembly P to the inoperative position thereby preventing its operation for the next succeeding cycle.

The timer and control unit S, as is best shown in FIGS. 12 and 13 as to the mechanical structure, includes sixteen normally open, cam-actuated switches 540 for automatic control of each station of the molding machine. Each switch 540 is further identified by the hyphenated, sequential numerals 1 through 16 for the respective plunger assemblies P with which the switch is associated. These switches 540 are mounted on a supporting structure in association with a cam-actuating mechanism which sequentially controls their operation with respect to the particular position of the turret T of the molding machine. This supporting structure for the switches include a base frame 541 adapted to be mounted on the structure of the machine and which carries two upstanding brackets 542 and 543 arranged in spaced relationship at each end of the base frame. Extending between the brackets 542 and 543 and journaled in suitable bearing structures mounted on each bracket is an elongated, main shaft 544 which supports and drives the several cam mechanisms. One end of the shaft 544 extends a distance outwardly from the respective bracket 543 and is provided with a sprocket gear 545 and is drivingly connected by a sprocket chain 546 to a sprocket gear 547 mounted on the shaft 475. Shaft 475 is gearingly connected to the ring gear 17. The respective gear ratios are chosen such that the shaft 544 will be driven at a predetermined rate in respect to the rotation of the turret T.

Mounted on the shaft 544 is an elongated mandrel 548 which is journaled on the shaft for relative rotation. Suitable bearings or bushings 549 are interposed between the shaft 544 and the mandrel 548. Mounted on the mandrel 548 are the several cam assemblies for actuating the respective switches 540. Each of the cam assemblies 550 comprises a flanged hub on which is mounted a cam roller 551. Each of the switches 540, which may be of the micro-switch type, is mounted on a supporting bracket 552 in operative relationship to a respective cam assembly 550 and each switch is provided with a respective actuating lever 553 which is adapted to be engaged by the respective cam roller 551 during each revolution thereof and effect closing of the switch contacts. Each cam roller 551 is angularly displaced relative to the preceding cam roller by an angular distance of one-sixteenth of a circular arc which results in actuation of each of the switches 540 during each cyclic revolution of the cam assemblies 550 mounted on the mandrel 548. A driving connection is formed between the shaft 544 and the mandrel 548 by a transfer gear assembly 554. This transfer gear assembly 554 includes a drive pinion 555 mounted on the shaft 544 and drives a jack shaft 556 on which are mounted the gears 557 and 558. A driven gear 559 intermeshes with gear 558 and is drivingly connected with the mandrel 548 by a hub assembly 560. The gears form a driving connection between the shaft 544 and the mandrel 548. The gear ratios are selected to provide a sixteen to one speed reduction with the mandrel 548 being revolved one revolution for each sixteen revolutions of the main shaft 544. Also mounted on the shaft 544 is an auxiliary cam assembly 561 which controls the operation of the pulse-timing switch 562 and a single station switch 563. This auxiliary cam assembly 561 comprises a flanged hub assembly on which are mounted two cam rollers 564 and 565 for operating the respective switches 562 and 563 which may be of the lever-actuated, micro-switch type. Switch 562 is of the normally open type and switch 563 is of the normally closed type and both switches will be actuated once during each revolution of the shaft 544.

The electric control circuit in conjunction with the timing control unit S operates to continuously mold glass articles with each of the plungers following a predetermined operational sequence. In the normal operating state, the sequence is automatically controlled once the machine has been placed in operation. However, the circuit includes switches and selector mechanisms which will permit alternative, selective manual operation with independent control of each of the plunger assemblies P. In the usual automatic operating state, the selector switches 513 and 514 would be placed in their respective AUTO and RUN positions. Operation of the machine is then initiated through momentary actuation of the start switch 511 which completes an electrical circuit through the forward solenoid 503 of the motor controller 500. Energizing the solenoid 503 will close the line contactors 501 to energize the motor 15 for operation of the turret T in a forward direction. After the solenoid 503 has been energized, a holding circuit for the solenoid is formed through the auxiliary contacts 505 which will maintain a continuously energized circuit to the motor 15. At any time that it is desired to stop the operation of the molding machine, it is only necessary to momentarily actuate the stop contactor 512 which is interposed in the circuit and which will interrupt the circuit to the solenoid 503 and thus open the line contactors 501 while simultaneously momentarily closing contacts 502 to reverse the current flow in the motor 15 to provide dynamic braking when in either the INCH or JOG mode of operation. During the time that the timing control unit S is operating in timed relationship to the rotation of the turret T, the switches 540–1 through 540–16 will be sequentially operated to complete a circuit through a respective switch and the pulse-timing switch 562 to energize the solenoid 527 of the trip-lever control lever control valve, assuming that the respective manual contactor 516 has been actuated to complete a circuit through the DOWN contacts. The effect of the sequential operation of the switches 540 for energization of the solenoid 527 is to operate the trip-lever control mechanism 610 for properly positioning each of the trip levers 604 to permit the respective plunger to follow the normal operational track around the turret T in accordance with the predetermined molding operation. During the normal continuous operation of the molding machine, the delivery apparatus D functions to deliver a quantity of molten glass to the mold. The delivery valve solenoid 529 may be energized by manual operation of contactor switch 518 at any time that it is desired to prevent delivery of the molten glass to a mold. As each plunger passes the press and hold-down cylinder stations, the press cylinder 220, hold-down cylinder 400 and hold-down cylinder 401 are actuated to press the glass in the mold.

At any time that it is desired to prevent any one of the plungers from following the normal operational track during the continuously operating sequence, it is only necessary to actuate the respective manual contactor 516 to place the contacts in the illustrated UP positions. Actuating the appropriate manual plunger control switch 516 to maintain the respective plunger in an UP position will complete a circuit through the solenoid 526 of the trip lever control valve and thereby position the lever 604 in its inoperative position and thereby prevent the plunger from following the normal operating track. As long as the plunger control contactor 516 is maintained in this UP position, the respective plunger will be prevented from performing an operation and the plunger will be maintained out of operation until the contactor 516 is subsequently actuated to again complete a circuit through the solenoid 527 and thereby again position the lever 604 in operative position. All other plungers which remain in operation will continue to follow the normal operational track as the solenoid 526 will only be energized at the particular stage in the rotation of the turret T as determined by the operation of the timer swiches 540 to effect placement of the trip lever 604 associaed with the respecive plunger.

If, at some time, especially during adjustment periods, it is desired to operate the molding machine intermittently, the selector switches 513 and 514 would be placed in the respective manual and jog positions. This will complete a circuit to the selector switch 515 which would be set to select either the INCH or JOG position and complete a circuit to permit operation of either the contactor 519 or 520. With the switches being selectively set to permit operation of contactor 519, the momentary actuation of this switch will complete a circuit for energization of the drive motor 15 and the turret T will rotate one-sixteenth of a revolution and the circuit will then be interrupted automatically by the timer-operaed switch 563 to deenergize the motor 15 and stop the turret. If the selector switches are selectively set to permit operation of the contactor 520, the actuation of this contactor will complee a circuit for energization of the motor 15 during the time that the contactor 520 is actuated. Release of the contactor 520 will interrupt the circuit and deenergize he motor 15 stopping the turret.

It will be apparent from the above indicated description that this invention provides various important improvements over the structure disclosed in said patent. These improved structures include the plunger-lowering gap track unit, the pressing plunger unit, the plunger lifting unit, and the valve stem lifting unit. Also, it includes a novel timing and control system.

Having thus described this invention, what is claimed is:

1. A continuous glass molding machnie comprising a turret mounted for rotation about a central axis, means for continuously rotating the turret, said turret including a mold table rotatable with the turret and having molds thereon at angularly spaced intervals about said axis, means for supplying glass charges to successive molds during the continuous rotation of the mold table, means for pressing the glass charges in the respective molds during the continuous rotation of the mold table and including pressing plunger assemblies supported by the turret at angularly spaced intervals for movement therewith in alignment with the respective molds having plungers movable axially into and out of cooperation with the respective molds, means for imparting controlled axial movement to the plungers to cause them to move into and out of cooperation with the molds so as to press and form the charges in the respective molds, said last-named means comprising a control system including control means disposed at angularly spaced, normally fixed positions about said turret and actuated by actuating means associated with each of said aligning plunger assemblies and cooperating molds and movable with said turret into successive cooperation with said control means, and means for selectively positioning each of said actuating means in operative or inoperative position relative to said control means to render operative or inoperative the plunger controlled thereby during its movement with the rotating turret, said control system being a pneumatic system and said control means being pneumatic valves connected in said pneumatic system, said actuating means comprising trip levers mounted on the turret at angularly spaced positions for mechanically engaging the valves, said positioning means swinging each of the trip levers into either an operative position for engaging the valves or an inoperative position for missing the valves and comprising cam means supported at a fixed position relative to the turret and having cam portions selectively movable into position to engage with the levers for moving them into either operative or inoperative position, pneumatic means for moving said cam means, and electric means for selectively controlling actuation of said pneumatic cam-positioning means.

2. A continuous glass molding machine according to claim 1 in which said means for imparting axial movement to the plungers includes a plurality of pressure-applying cylinder and piston units having means for successively engaging the plungers during the continuous rotation of the turret and applying pressure thereto to cause them to cooperate with the molds in the pressing the charges therein, said units being disposed at angularly spaced fixed positions relative to said rotating turret.

3. A continuous glass molding machine according to claim 2 in which said means for imparting axial movement to the plungers also comprises a stationary track extending around the turret for cooperation with track followers carried by the respective plungers, said track including an upper level section and a lower level section, said upper section having a movable gap track section associated with a gap leading to a declining track section which leads to said lower section, said cylinder and piston units being disposed along said lower track section, and a cylinder and piston unit operatively connected to said gap track section for moving it between positions where the gap is closed and opened, a push-down cylinder and piston unit mounted adjacent said gap track section for engaging the respective plungers as they move into co-operation with said declining track section to apply pressure thereto and cause the track-followers to follow said declining track section, said control system comprising means for simultaneously actuating said push-down cylinder and piston unit and said gap track moving cylinder and piston unit to open the gap track section and simultaneously apply downward pressure to the respective plunger.

4. A continuous glass molding machine comprising a turret mounted for rotation about a central axis, means for continuously rotating the turret, said turret including a mold table rotatable with the turret and having molds thereon at angularly spaced intervals about said axis, means for supplying glass charges to successive molds during the continuous rotation of the mold table, means for pressing the glass charges in the respective molds during the continuous rotation of the mold table and including pressing plunger assemblies supported by the turret at angularly spaced intervals for movement therewith in alignment with the respective molds having plungers movable axially into and out of cooperation with the respective molds, means for imparting controlled axial movement to the plungers to cause them to move into and out of cooperation with the molds so as to press and form the charges in the respective molds, said last-named means comprising a control system including control means disposed at angularly spaced, normally fixed positions about said turret and actuated by actuating means associated with each of said aligning plunger assemblies and cooperating molds and movable with said turret into successive cooperation with said control means, and means for selectively positioning each of said actuating means in operative or inoperative position relative to said control means to render operative or inoperative the plunger controlled thereby during its movement with the rotating turret, said control system being a pneumatic system and said control means being pneumatic valves connected in said pneumatic system, said actuating means comprising trip levers for mechanically engaging the valves, said positioning means swinging each of the trip levers into either an operative position for engaging the valves or an inoperative position for missing the valves and comprising cam means having cam portions selectively movable into position to engage with the levers for moving them into either operative or inoperative position, pneumatic means for moving said cam means, and electric means for selectively controlling actuation of said pneumatic cam-positioning means, said means for imparting axial movement to the plungers including a plurality of pressure-applying cylinder and piston units having means for engaging the plungers during the continuous rotation of the turret and applying pressure thereto to cause them to cooperate with the molds in pressing the charges therein, said units being disposed at angularly spaced fixed positions relative to said rotating turret, a plunger elevating unit located angularly beyond said pressure-applying cylinder and piston units in the direction of rotation of said turret, said elevating unit comprising an endless type lift conveyor having successive flights adapted to be brought into engagement with the respective plungers to lift them as they move into association therewith, said means for imparting axial movement to the plungers comprising a stationary track extending around the turret for cooperation with track followers carried by the respective plungers, said track including an upper level section and a lower level section, said upper track section having a gap through which said track followers of the respective plungers can be moved, said flights of the elevating unit being movable successively into a position for engaging with the track follower of a respective plunger as it moves into a position adjacent said gap and at which time the engaging flight is tangential to the turret, and means for continuously driving the endless lift conveyor.

5. A continuous glass molding machine according to claim 4 in which each of said molds on the mold table is provided with a vertically movable lifting valve, a valve lift unit located beyond said plunger elevating unit in the direction of rotation of said turret, said valve lift unit comprising an endless type elevator conveyor having successive flights and normally disposed in inclined position for engagement by the lifting valves of respective molds moved successively into association therewith by rotation of said turret, and means for continuously driving said elevator conveyor.

6. A continuous glass molding machine according to claim 5 in which said elevator conveyor is pivotally supported at its lower end and is inclined upwardly relative to the direction of rotation of said mold table, and cushioning means yieldable under a predetermined force operatively connected to and normally holding said conveyor in its upwardly inclined position.

7. A continuous glass molding machine according to claim 1 in which said means for supplying the glass charges to the molds comprises a delivery chute movably supported for selective positioning either to guide a gob of molten glass to each succeeding mold on the mold table or to guide it away from the mold, a pneumatic cylinder and piston unit connected to the chute for moving it between its positions, a pair of valves for controlling said cylinder and piston unit to selectively move the chute to its different positions, said valves being positioned for selective engagement by said trip levers when in operative or inoperative positions, said control system including an electric circuit comprising a switch for each of said pressing plunger assemblies connected to said positioning means for sequential operation thereof, a cam for actuating each of said switches mounted on a rotatable mandrel, means for continuously rotating said mandrel in timed relationship to the continuous rotation of said turret, and manual contactor means connected to each of said cam-operated switches for selecting the position of said positioning means to move the trip lever of the respective plunger assembly to operative or inoperative position.

8. A continuous glass molding machine according to claim 7 in which said mandrel is rotatably mounted on a rotatably supported shaft and a pulse-timing switch connected in said circuit, said shaft carrying separate cam means for actuating said pulse-timing switch, and means for continuously driving said shaft at a different rate of speed from said mandrel in timed relationship to the continuous rotation of said turret as to actuate said pulse-timing switch, said pulse-timing switch being connected in circuit with said trip lever positioning means to move it when actuated to position the respective lever.

9. A continuous glass molding machine according to claim 8 comprising a manually operable reversing and control valve for controlling said chute-positioning cylinder and piston unit manually without actuating either of said valves of the pair.

10. A continuous glass molding machine according to claim 9 including an electrically actuated override valve for overriding all of said valves to control said chute-positioning cylinder and piston unit to move the chute away from the mold a switch for controlling said valve, means for removing formed articles from each successive mold, said switch being engaged by an article removed from each mold but being actuated upon failure of removal of an article from a mold of a particular mold and plunger assembly to operate said positioning means to move the trip lever of that assembly into inoperative position.

11. A continuous glass molding machine comprising a turret mounted for rotation about a central axis, means for continuously rotating the turret, said turret including a mold table rotatable with the turret and having molds thereon at angularly spaced intervals about said axis, means for supplying glass charges to successive molds during the continuous rotation of the mold table, means for pressing the glass charges in the respective molds during the continuous rotation of the mold table and including pressing plunger assemblies supported by the turret at angularly spaced intervals for movement therewith in alignment with the respective molds having plungers movable axially into and out of cooperation with the respective molds, means for imparting controlled axial movement to the plungers to cause them to move into and out of cooperation with the molds so as to press and form the charges in the respective molds and including a plurality of pressure-applying cylinder and piston units having means for engaging the plungers successively during the continuous rotation of the turret and applying pressure thereto to cause them to cooperate with the molds in pressing the charges therein, said units being supported at angularly spaced fixed positions relative to said rotating turret and adjacent each other so that the successive units continue pressure on the plungers for a predetermined period during movement of the turret.

12. A continuous glass molding machine according to claim 11 in which said means for imparting axial movement to the plungers also comprises a stationary track extending around the turret for cooperation with track followers carried by the respective plungers, said track including an upper level section and a lower level section, said upper section having a movable gap track section associated with a gap leading to a declining track section which leads to said lower section, said cylinder and piston units being disposed along said lower track section, and a cylinder and piston unit operatively connected to said gap track section for moving it between positions where the gap is closed and opened, a push-down cylinder and piston unit mounted adjacent said gap track section for engaging the respective plungers as they move into cooperation with said declining track section to apply pressure thereto and cause the track-followers to follow said declining track section, and means for simultaneously actuating said push-down cylinder and piston unit and said gap track moving cylinder and piston unit to open the gap track section and simultaneously apply downward pressure to the respective plunger.

13. A continuous glass molding machine according to claim 11 including a plunger elevating unit located angularly beyond said pressure-applying cylinder and piston units in the direction of rotation of said turret, said elevating unit comprising an endless type lift conveyor having successive flights adapted to be brought into engagement with the respective plungers to lift them as they move in association therewith, said means for imparting axial movement to the plungers comprising a stationary track extending around the turret for cooperation with track followers carried by the respective plungers, said track including an upper level section and a lower level section, said upper track section having a gap through which said track followers of the respective plungers can be moved, said flights of the elevating unit being movable successively into a position for engaging with the track follower of a respective plunger as it moves into a position adjacent said gap and at which time the engaging flight is tangential to the turret, and means for continuously driving the endless lift conveyor.

14. A continuous glass molding machine according to claim 11 in which each of said molds on the mold table is provided with a vertically movable lifting valve, a valve lift unit located in cooperation with said mold table and comprising an endless type elevator conveyor having successive flights and normally disposed in inclined position for engagement by the lifting valves of respective molds moved successively into association therewith by rotation of said mold table, and means for continuously driving said elevator conveyor.

15. A continuous glass molding machine according to claim 14 in which said elevator conveyor is pivotally supported at its lower end and is inclined upwardly relative to the direction of rotation of said mold table, and cushioning means yieldable under a predetermined force operatively connected to and normally holding said conveyor in its upwardly inclined position.

16. In a continuous glass molding machine having molds supported on a continuously rotatable mold table, a vertically movable lifting valve provided for each mold, a unit located adjacent said mold table in a fixed angular position for controlling the vertical position of the valves in the molds, said valve unit comprising an endless type conveyor having successive flights and normally disposed in inclined position for engagement by the lifting valves of respective molds moved successively into association therewith by rotation of said mold table, and means for continuously driving said conveyor.

17. In a continuous glassware producing machine having a rotatable turret, implements carried by said turret at angularly spaced intervals for rotation therewith and mounted for vertical movement relative to cooperating units on said turret at corresponding angularly spaced intervals, means for controlling the vertical movement of said implements during the continuous movement of said turret, said means comprising an endless type vertically movable conveyor located adjacent the periphery of the turret in a fixed angular position relative thereto and having successive vertically movable flights adapted to be brought successively into engagement with the successive implements as the turret rotates to control the vertical positions of said implements, and means for continuously driving said conveyor.

References Cited

UNITED STATES PATENTS

| | | | |
|---|---|---|---|
| 1,590,481 | 6/1926 | Stenhouse et al. | 65—251 |
| 2,811,815 | 11/1957 | Eldred | 65—318 XR |
| 2,984,047 | 5/1961 | Mennitt et al. | 65—165 X |
| 3,418,096 | 12/1968 | Bathellier | 65—159 X |

ARTHUR D. KELLOGG, Primary Examiner

U.S. Cl. X.R.

65—223, 225, 320